United States Patent
Budianu et al.

(10) Patent No.: US 8,831,141 B2
(45) Date of Patent: Sep. 9, 2014

(54) LEADING EDGE DETECTION

(75) Inventors: Petru Cristian Budianu, San Diego, CA (US); Amal Ekbal, San Diego, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 826 days.

(21) Appl. No.: 12/887,659

(22) Filed: Sep. 22, 2010

(65) Prior Publication Data

US 2011/0316747 A1     Dec. 29, 2011

Related U.S. Application Data

(60) Provisional application No. 61/358,633, filed on Jun. 25, 2010.

(51) Int. Cl.
*H04L 27/00*     (2006.01)
*H03D 3/00*     (2006.01)

(52) U.S. Cl.
USPC ........... 375/316; 375/324; 375/326; 375/323; 375/322

(58) Field of Classification Search
USPC ............... 375/219, 222, 226, 240.26–240.28, 375/270, 278, 284, 285, 295, 316, 324, 326, 375/338, 339, 346, 354, 355, 340, 322, 323
See application file for complete search history.

(56) References Cited

U.S. PATENT DOCUMENTS

| | | | |
|---|---|---|---|
| 3,602,825 A | 8/1971 | Senior | |
| 4,115,773 A | 9/1978 | Metcalf | |
| 4,455,556 A | 6/1984 | Koshio et al. | |
| 5,555,277 A | 9/1996 | Lawrence et al. | |
| 6,414,635 B1 | 7/2002 | Stewart et al. | |
| 6,697,629 B1 * | 2/2004 | Grilli et al. | 375/148 |
| 7,151,759 B1 | 12/2006 | Ryan et al. | |
| 7,653,004 B2 | 1/2010 | Strutt | |
| 7,710,321 B2 | 5/2010 | Heidari-Bateni et al. | |
| 7,719,994 B2 | 5/2010 | Zumsteg | |
| 7,739,705 B2 | 6/2010 | Lee et al. | |
| 7,817,762 B2 | 10/2010 | Johnstone et al. | |
| 7,822,098 B2 | 10/2010 | Sahinoglu | |

(Continued)

FOREIGN PATENT DOCUMENTS

| | | |
|---|---|---|
| CN | 101251594 A | 8/2008 |
| EP | 1667321 A1 | 6/2006 |

(Continued)

OTHER PUBLICATIONS

International Search Report and Written Opinion—PCT/US2011/041880—ISA/EPO—Jan. 17, 2012.

(Continued)

*Primary Examiner* — Sam K Ahn
*Assistant Examiner* — Linda Wong
(74) *Attorney, Agent, or Firm* — Paul S. Holdaway

(57) ABSTRACT

A leading edge associated with a received signal is detected to provide, for example, time of arrival information for a ranging algorithm. In some aspects, a method of leading edge detection involves sampling a received signal, generating a drift compensated signal based on the samples, reconstructing the received signal based on the drift compensated signal, and identifying a leading edge associated with the received signal based on the reconstructed signal.

55 Claims, 14 Drawing Sheets

(56) References Cited

U.S. PATENT DOCUMENTS

| | | | |
|---|---|---|---|
| 8,036,064 B2 | 10/2011 | McFarland | |
| 8,184,038 B2* | 5/2012 | Ekbal et al. | 342/109 |
| 8,289,159 B2 | 10/2012 | Julian et al. | |
| 8,552,903 B2 | 10/2013 | Julian et al. | |
| 2003/0053493 A1 | 3/2003 | Graham Mobley et al. | |
| 2003/0147655 A1 | 8/2003 | Shattil | |
| 2004/0005022 A1* | 1/2004 | Zhu et al. | 375/365 |
| 2004/0058653 A1* | 3/2004 | Dent | 455/69 |
| 2005/0058081 A1 | 3/2005 | Elliott | |
| 2006/0120441 A1 | 6/2006 | Nakagawa et al. | |
| 2007/0165756 A1* | 7/2007 | Lachartre | 375/346 |
| 2007/0200759 A1 | 8/2007 | Heidari-Bateni et al. | |
| 2007/0243843 A1 | 10/2007 | Shalash | |
| 2007/0258548 A1 | 11/2007 | Sutton | |
| 2007/0276616 A1 | 11/2007 | Wilcox | |
| 2008/0043824 A1 | 2/2008 | Jacobs et al. | |
| 2008/0056419 A1 | 3/2008 | Lee et al. | |
| 2008/0225758 A1 | 9/2008 | Proctor et al. | |
| 2008/0252517 A1* | 10/2008 | Fuchs et al. | 342/357.1 |
| 2009/0033399 A1 | 2/2009 | Schwoerer et al. | |
| 2009/0149132 A1* | 6/2009 | LeFever et al. | 455/67.11 |
| 2009/0149202 A1 | 6/2009 | Hill et al. | |
| 2009/0170458 A1 | 7/2009 | Molisch et al. | |
| 2009/0310586 A1 | 12/2009 | Shatti | |
| 2010/0045508 A1 | 2/2010 | Ekbal et al. | |
| 2010/0046388 A1 | 2/2010 | Kim et al. | |
| 2010/0054322 A1 | 3/2010 | Hui et al. | |
| 2010/0112967 A1 | 5/2010 | Sorensen | |
| 2011/0019002 A1 | 1/2011 | Jagmohan et al. | |
| 2011/0068966 A1 | 3/2011 | Daniels et al. | |
| 2011/0216816 A1* | 9/2011 | Frenzel | 375/222 |
| 2011/0222373 A1 | 9/2011 | Lee | |
| 2011/0292819 A1 | 12/2011 | Ekbal et al. | |
| 2011/0292820 A1 | 12/2011 | Ekbal et al. | |
| 2011/0294449 A1 | 12/2011 | Budianu et al. | |
| 2011/0294450 A1 | 12/2011 | Budianu et al. | |
| 2012/0001783 A1* | 1/2012 | Eklund et al. | 341/118 |
| 2012/0157205 A9* | 6/2012 | Danieli et al. | 463/36 |
| 2014/0009340 A1 | 1/2014 | Meador et al. | |

FOREIGN PATENT DOCUMENTS

| | | |
|---|---|---|
| GB | 2267192 A | 11/1993 |
| GB | 2419046 A | 4/2006 |
| JP | H02223882 A | 9/1990 |
| JP | 2005520139 A | 7/2005 |
| JP | 2008522181 A | 6/2008 |
| JP | 2008527769 A | 7/2008 |
| JP | 2008538065 A | 10/2008 |
| JP | 2009150872 A | 7/2009 |
| JP | 2009535625 A | 10/2009 |
| JP | 2010050964 A | 3/2010 |
| WO | 9716700 A1 | 5/1997 |
| WO | WO0193446 A2 | 12/2001 |
| WO | WO2005109634 A1 | 11/2005 |
| WO | 2006098790 | 9/2006 |
| WO | WO-2006112850 A1 | 10/2006 |
| WO | WO2007011357 A1 | 1/2007 |
| WO | 2007121488 A1 | 10/2007 |
| WO | WO-2007121476 A1 | 10/2007 |
| WO | 2007127886 A2 | 11/2007 |
| WO | WO-2007127721 A2 | 11/2007 |
| WO | WO2008022460 A1 | 2/2008 |
| WO | 2009110669 A1 | 9/2009 |
| WO | WO2009128590 A1 | 10/2009 |
| WO | 2009144582 | 12/2009 |
| WO | WO-2010022273 A1 | 2/2010 |

OTHER PUBLICATIONS

Han Yalan et al., "Research on Two-way Ranging-Based High Precision Clock Synchronization Method for Pseudo Satellite Network" (Research on High-precision Time Synchronization of Pseudolites Based on Bidirectional Ranging), Telemetering and telecontrol (Journal of Telemetry, Tracking and Command), May 2010, vol. 31, No. 3, 5pp.

* cited by examiner

LEADING EDGE DETECTION

CLAIM OF PRIORITY

This application claims the benefit of and priority to commonly owned U.S. Provisional Patent Application No. 61/358,633, filed Jun. 25, 2010, and the disclosure of which is hereby incorporated by reference herein.

BACKGROUND

1. Field of the Invention

This application relates generally to signal processing and more specifically, but not exclusively, to leading edge detection.

2. Relevant Background

Distance ranging involves determining (e.g., estimating) a distance between two locations. A ranging device measures the distance from the ranging device to another object through the use of various technologies such as laser, radar, sonar, or various forms of radio-frequency (RF) signaling. For convenience, the term distance ranging will be referred to herein simply as ranging.

To estimate the distance to an object, a ranging device determines the amount of time it takes for a signal to travel between the ranging device and the object. For example, a ranging device may measure the time it takes for a signal to travel to the object, reflect off that object, and travel back to the ranging device. Accordingly, the ranging device will record the time that it sends a signal and the time that the reflected signal is received back at the ranging device. The ranging device may then estimate the distance based on the signal propagation time and the known propagation speed of the signal (e.g., estimated as the speed of light).

In some cases, a two-way ranging scheme may be employed to determine the distance between two devices. Here, a first ranging device may determine the distance to a second ranging device based on a round-trip time associated with signals transmitted by the ranging devices. That is, in a two-way ranging scheme, the first ranging device sends a signal to the second ranging device and, in response, the second ranging device sends a signal to the first ranging device. To determine the round-trip time, each ranging device records the time at which that ranging device sends a signal to the other ranging device and the time at which that ranging device receives a signal from the other ranging device.

In some aspects, the accuracy of a ranging measurement depends on the accuracy with which a ranging device is able to determine when a signal is received (e.g., the time-of arrival of a signal). Accordingly, a need exists for effective techniques for determining the time-of-arrival of a signal.

SUMMARY

A summary of sample aspects of the disclosure follows. In the discussion herein, a reference to the term aspects may refer to one or more aspects of the disclosure.

The disclosure relates in some aspects to detecting a leading edge of a received signal to facilitate accurate time-of arrival measurements and, hence, accurate distance estimation. These techniques may be employed, for example, at a single ranging device or at each device involved in a two-way ranging scheme.

The disclosure relates in some aspects to a leading edge detection scheme that employs drift compensation followed by signal reconstruction. Here, a received signal is sampled then drift compensated. Next, the received signal is reconstructed based on the drift compensated signal. A leading edge of the received signal is then identified (e.g., a time-of arrival of the leading edge is estimated) based on a reconstructed signal. In some aspects, the resolution of the samples is increased so that the drift compensation or other operations may be performed at a higher resolution.

The disclosure relates in some aspects to a leading edge detection scheme for pulse-based communication (e.g., communication employing ultra-wideband (UWB) pulses). In some cases, such pulse-based communication may be used to achieve ultra-low power consumption (e.g., through the use of non-coherent radio components). Accordingly, leading edge detection as taught herein may be employed to provide an ultra-low power UWB radio.

BRIEF DESCRIPTION OF THE DRAWINGS

These and other sample aspects of the disclosure will be described in the detailed description and the appended claims that follow, and in the accompanying drawings, wherein:

Figure 1:
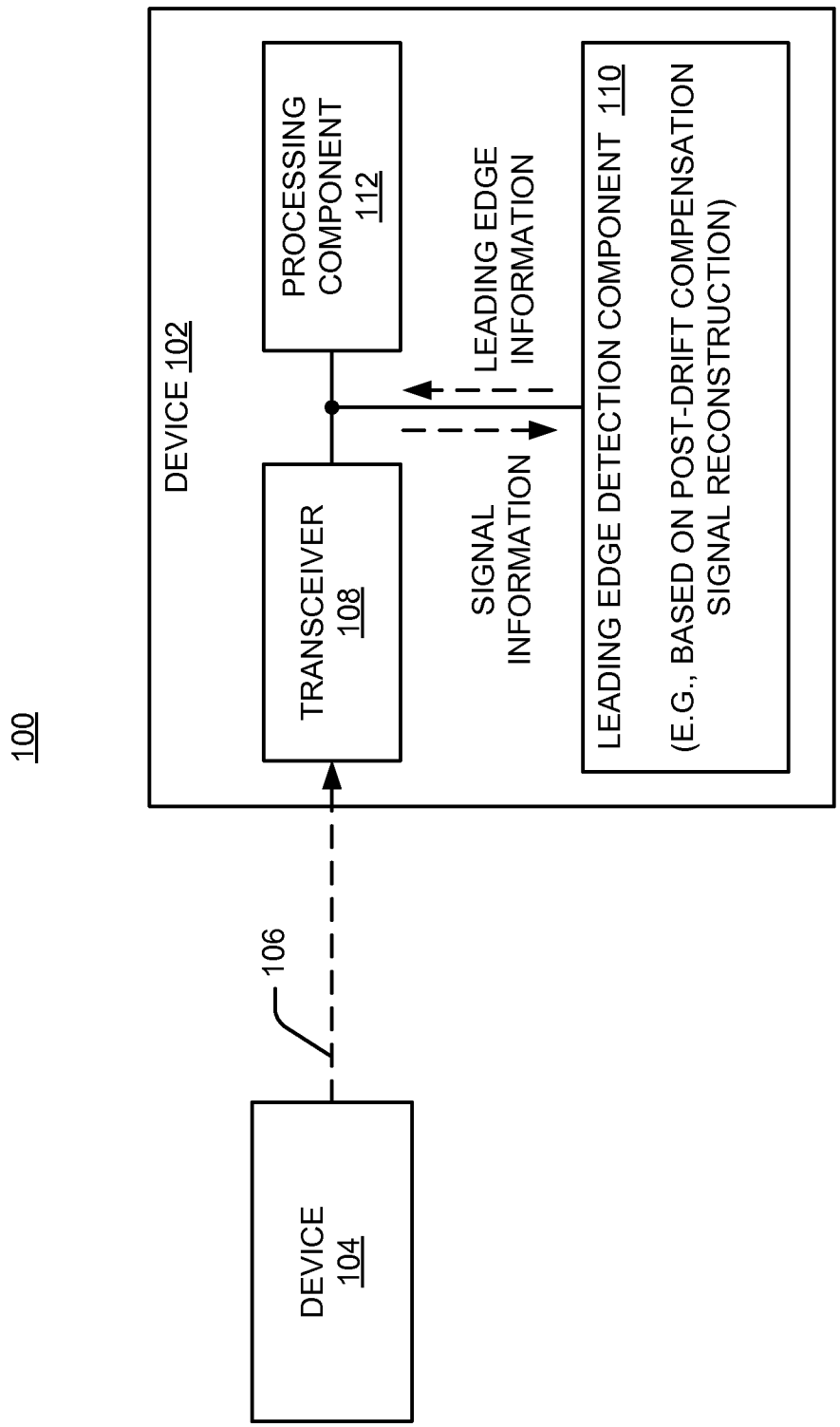
FIG. 1 is a simplified block diagram illustrating an example of a communication system incorporating leading edge detection.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects, a method of leading edge detection comprises: receiving a signal, sampling the received signal to generate samples, generating a drift compensated signal based on the samples, reconstructing the received signal based on the drift compensated signal, and identifying a leading edge associated with the received signal based on the reconstructed signal. In addition, in some aspects, the method may comprise increasing the resolution of the samples to generate higher resolution samples, wherein the generation of the drift compensated signal comprises time shifting the higher resolution samples.

FIG. 1 illustrates a sample communication system 100 including devices 102 and 104. During a ranging operation, the device 104 sends a signal to the device 102 (e.g., as represented by the dashed line 106). A transceiver 108 of the device 102 receives the signal and provides signal information (as represented by the corresponding dashed line) to a leading edge detection component 110.

In some aspects, leading edge detection may involve processing several received pulses to identify a leading edge associated with those pulses. For example, a preliminary timestamp may be generated upon reception of a first pulse of a set of pulses. All of the pulses of the set may then be processed to assist in determining (e.g., estimating) leading edge location and timing for these pulses (e.g., the average location and timing of a leading edge). The preliminary timestamp for the first pulse may then be adjusted based on the leading edge information for the set to provide a final time-of-arrival estimate.

As an example of the above, in a low power receiver (e.g., which may be advantageously employed in a UWB device), jitter and/or other conditions may adversely affect the accuracy with which the leading edge of a given pulse is identified. The effects of these conditions may be mitigated (e.g., averaged out), however, by generating a reconstruction of a received pulse based on several pulses. In this case, leading edge characteristics of the reconstructed signal may be correlated to any pulse of the set, thereby providing a more accurate leading edge time-of-arrival estimate for that pulse.

In some aspects, leading edge detection may involve identifying a leading edge of a signal lobe associated with a first local maximum of a reconstruction of the received signal. In this way, a leading edge may be accurately identified even if a signal is received via a channel that has multiple signal paths, which results in a received signal having multiple lobes.

In some implementations, the leading edge detection component 110 identifies a leading edge through the use of a post-drift compensation signal reconstruction scheme. Here, samples of a received signal are drift compensated, after which a reconstruction of the received signal is generated based on the drift compensated signal. Advantageously, such a scheme may facilitate higher resolution drift compensation, thereby improving the accuracy of the leading edge detection operation.

For purposes of illustration, FIG. 1 depicts the transmission of signals from the device 104 to the device 102 and components of the device 102 that facilitate receiving and processing those signals. It should be appreciated, however, that the device 102 also may send signals to the device 104 and that the device 104 may include components that are similar to those depicted for the device 102. For example, in conjunction with two-way ranging operations, the leading edge detection component 110 may provide leading edge information (as represented by the corresponding dashed line) such as estimated time-of-arrival information that is sent via the transceiver 108 to the device 104. Also, a processing component 112 may send information to and receive information from the device 104 (e.g., in conjunction with two-way ranging operations) via the transceiver 108.

The devices 102 and 104 may be implemented in various ways. In some implementations, the devices 102 and 104 comprise wireless devices (e.g., nodes) that transmit RF signals over-the-air. In other implementations the devices may transmit other types of signals (e.g., optical signals).

Figure 2:
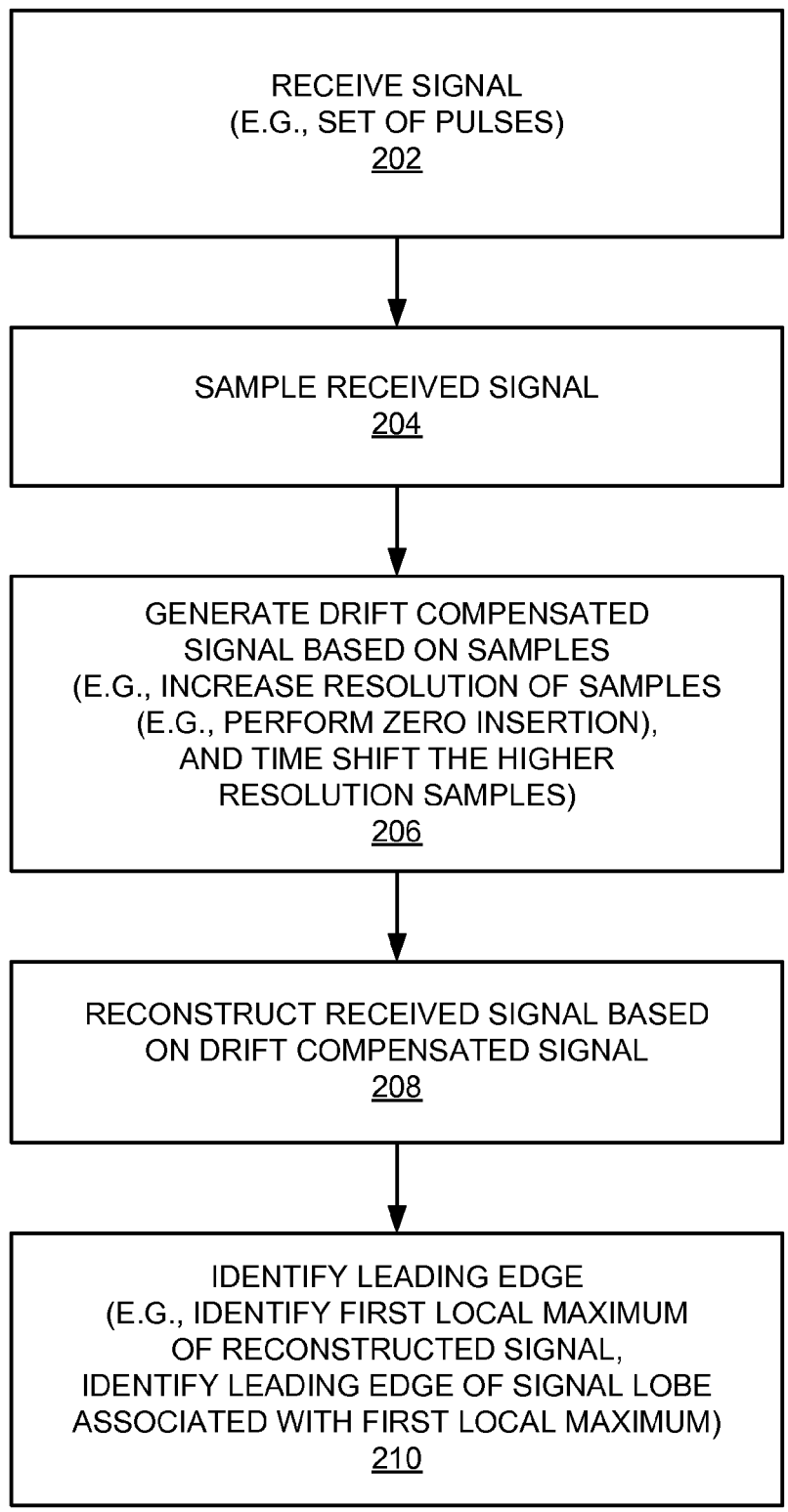
FIG. 2 is a flowchart of several sample aspects of operations that may be performed to identify a leading edge based on post-drift compensation signal reconstruction.

Examples of leading edge detection operations that may be performed by a system such as the system 100 will be described in more detail in conjunction with the flowchart of FIG. 2. FIG. 2 describes an example of operations that may be employed in an implementation that uses post-drift compensation signal reconstruction operations in accordance with the teachings herein.

The operations of FIG. 2 are described from the perspective of an apparatus that receives a signal and identifies a leading edge associated with that signal. For convenience, the operations of FIG. 2 (or any other operations discussed or taught herein) may be described as being performed by specific components (e.g., the components of FIG. 1, 3, 7, 8, or 12). It should be appreciated, however, that these operations may be performed by other types of components and may be performed using a different number of components. It also should be appreciated that one or more of the operations described herein may not be employed in a given implementation.

Referring to FIG. 2, at some point in time a signal is received as represented by block 202. As discussed above, in some cases the signal comprises a set (e.g., a sequence) of pulses.

As represented by block 204, the received signal is sampled to provide a set of samples. For example, in some implementations a 1-bit sampler (one-bit quantization) is used to generate a corresponding set of samples for each received pulse.

As represented by block 206, a drift compensated signal is generated based on the received signal. Here, drift compensation may be used to compensate for any timing differences between the clock signal used at the apparatus that sends the signal and the clock signal used at the apparatus that receives the signal. For example, the samples for a given pulse may be time shifted based on a drift estimate corresponding to the time at which that pulse is received. Accordingly, different time shifts may be applied to the samples for different pulses of the received signal.

In some implementations, the samples are subjected to a resolution increasing operation prior to the drift compensation operation. For example, a zero-insertion process may be employed to increase the number of samples. As a specific example, a defined number of zero samples may be inserted adjacent each original sample. In this way, the resolution of the drift compensation operations may be increased since a larger number of samples is used to represent the input signal. Thus, time shifting of the higher resolution samples may be performed at a timing resolution that is higher than a timing resolution of the sampling.

As represented by block 208, a reconstruction of the received signal is generated based on the drift compensated signal. For example, the sample sets for each received pulse may be summed (e.g., via a column-wise summation) to provide a vector that is representative of the shape of an average of the pulses.

As represented by block 210, a leading edge associated with the signal is identified based on the reconstructed signal. For example, initially a first local maximum of the signal reconstruction is identified. A leading edge of a lobe associated with the first local maximum is then identified, such that a time-of-arrival of the leading edge may be determined. Advantageously, by identifying a leading edge associated with a first local maximum, this scheme may be used to accurately detect a true leading edge of a signal as opposed to an edge associated with a refracted signal (e.g., in the case of a multipath channel).

As described in more detail below in conjunction with FIGS. 8-10, various advantages may be achieved when using post-drift compensation signal reconstruction in a ranging algorithm. For example, in some aspects, the algorithm may provide sub-sample clock drift correction using information (e.g., a drift estimate) provided by a time tracking block. In some aspects, the algorithm may provide a flexible distance estimation method based on variation of a post filtered signal, whereby a high level of performance is provided in single path channels or multipath channels. In some aspects, the algorithm may provide sub-sample time of arrival estimation through the use of an interpolation window that has a length that is adapted to the maximum width of a received pulse in a single path channel. In some aspects, the algorithm may be implemented at a low bit width (e.g., that may be beneficial in low-power high bandwidth applications). In some aspects, the algorithm may employ relatively simple automatic gain control (AGC) that sets the AGC level based on received noise, whereby the AGC level remains at the same level during pulse acquisition for ranging.

Figure 3:
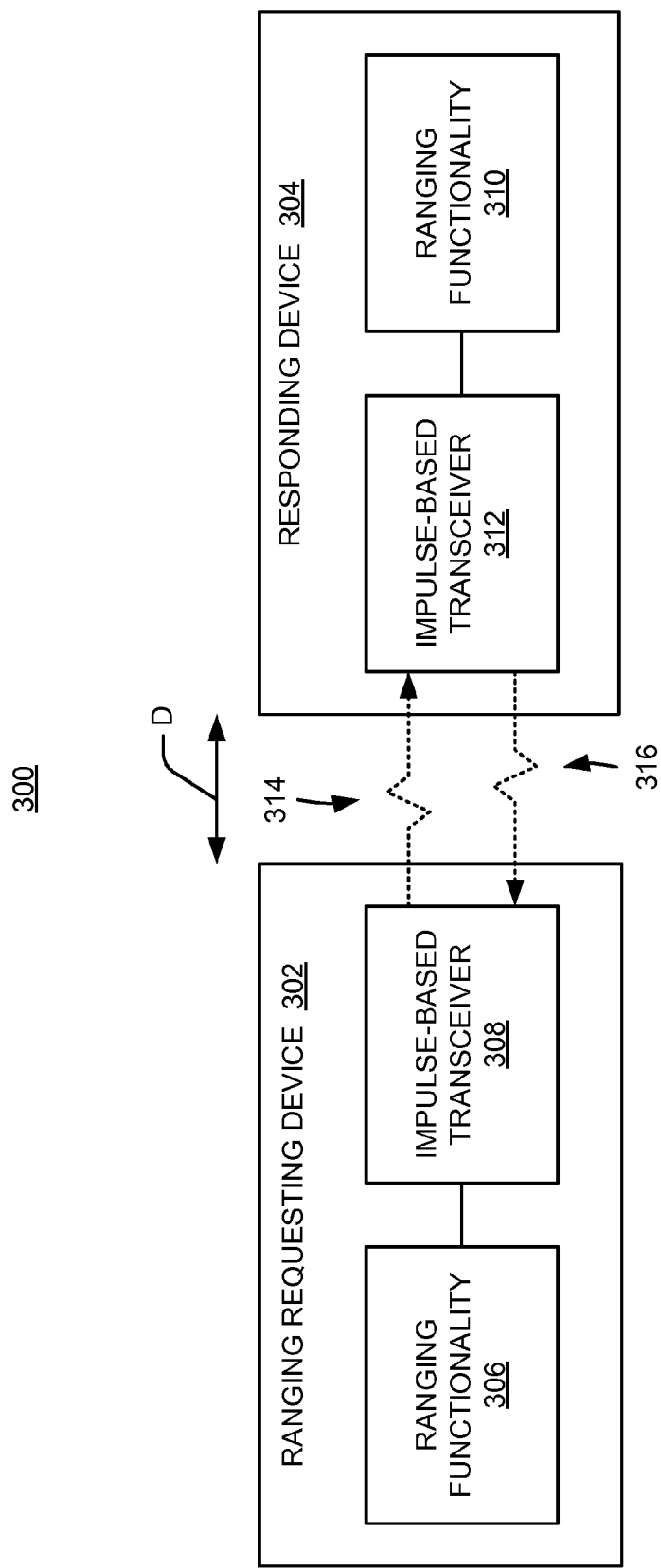
FIG. 3 is a simplified block diagram illustrating an example of a communication system configured to perform two-way ranging.

For purposes of illustration, additional details of leading edge detection in accordance with the teachings herein will be described in the context of a ranging system 300 as shown in FIG. 3. In some wireless systems (e.g., a system employing portable UWB devices), it is desirable to utilize low power and/or low cost devices. Such constraints may, however, limit the capabilities of these devices. For example, it may not be feasible to use coherent radios (which may otherwise facilitate precise distance estimation) in ultra-low power and low cost devices because coherent radios may be relatively complex and/or have relatively high power consumption. Consequently, conventional schemes may not provide a desired combination of ultra-low power and precise leading edge detection.

In the example of FIG. 3, the device 302 may initiate a two-way ranging operation to determine a distance D between the devices 302 and 304. In accordance with the teachings herein, the devices 302 and 304 employ low power UWB pulse-based receivers in conjunction with one or more of the leading edge detection schemes described herein to provide accurate (e.g., sub-foot precision) ranging. Here, ranging functionality 306 of the device 302 cooperates with an impulse-based transceiver 308 to send messages to and receive messages from the device 304. For example, the device 302 may send messages to the device 304 to request initiation of a ranging operation, provide clock drift information, provide gain control information, and provide ranging data (for leading edge detection). The transceiver 308 sends these messages via a series of pulses as represented by the dashed line 314. Similarly, ranging functionality 310 of the device 304 cooperates with an impulse-based transceiver 312 to send messages to and receive messages from the device 302. For example, the device 304 may send messages to the device 302 to respond to the ranging request, provide gain control information, and provide ranging data (for leading edge detection). The transceiver 312 sends these messages via a series of pulses as represented by the dashed line 316.

Figure 4:
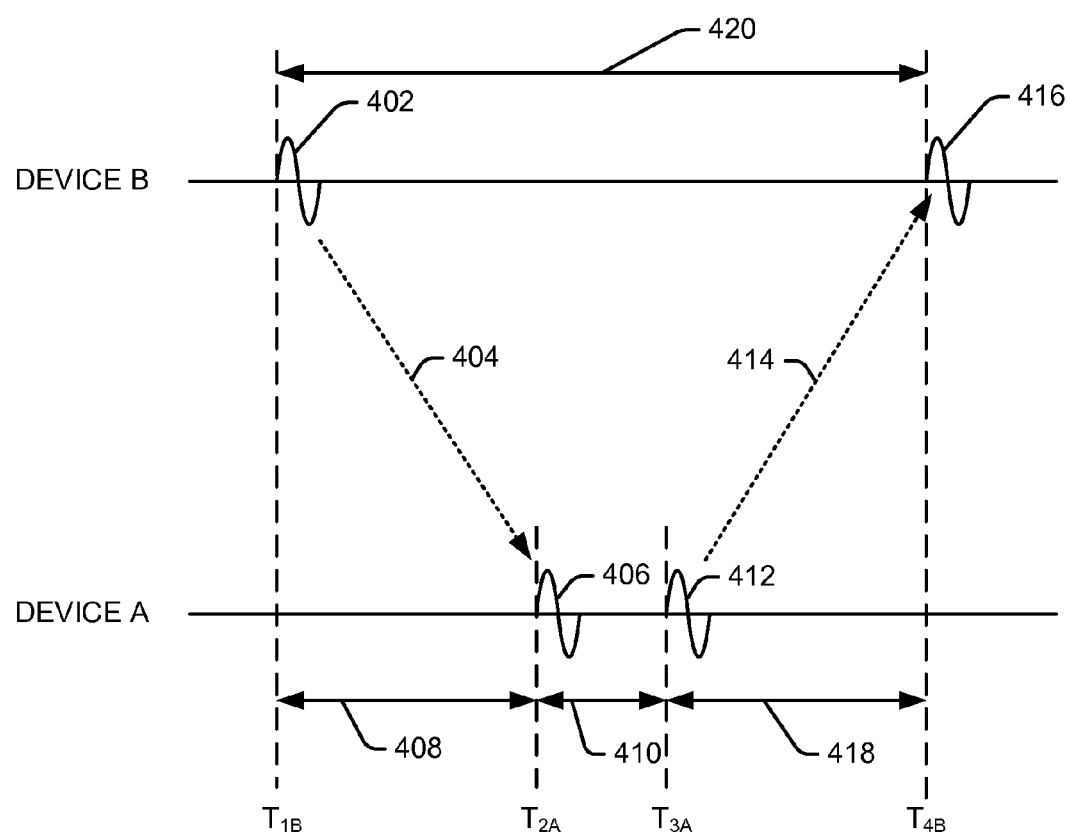
FIG. 4 is a simplified diagram illustrating an example of two-way ranging signaling.

FIG. 4 illustrates a simplified example of ranging signal timing for two devices (e.g., wireless devices) performing a two-way ranging operation. Here, a device A (e.g., the device 302) may determine the distance to a device B (e.g. the device 304) based on a round-trip time associated with signals transmitted by the devices. For example, distance may be estimated based on the equation: $D=T_P*C$, where D is the estimated distance, $T_P$ is the signal propagation delay from one device to the other, and C is the speed of light. The signal propagation delay $T_P$, may be estimated based on the round-trip time as discussed below.

The signals of FIG. 4 are depicted in a simplified form for purposes of illustration. Here, a device B generates a signal 402 that is transmitted over-the-air (as represented by an arrow 404) to a device A. This signal is received at the device A (as represented by a signal 406) after a propagation time represented by a time period arrow 408. Following a turn-around time period (as represented by a time period arrow 410) after receiving the signal 406, the device A generates a signal 412 that is transmitted over-the-air (as represented by an arrow 414) to the device B. This signal is received at the device B (as represented by a signal 416) after a propagation time represented by a time period arrow 418. Each device generates a timing indication (hereafter referred to, for convenience, as a timestamp) associated with the transmission and reception of these signals. For example, the devices A and B may record transmit timestamps at $T_{3A}$ and $T_{1B}$, respectively, and the devices A and B may record receive timestamps at $T_{2A}$ and $T_{4B}$, respectively. Based on these timestamps, an estimated propagation delay $T_P$ (e.g., corresponding to time period arrow 408 or 418) may be computed. For example, a round-trip time estimate may be determined according to: $2T_P=(T_{4B}-T_{1B})-(T_{3A}-T_{2A})$. Here, $T_{1B}$, $T_{2A}$, $T_{3A}$, and $T_{4B}$ are measureable. In addition, device B may send to device A an indication of the time period between $T_{1B}$ and $T_{4B}$ (represented by a time period arrow 420) measured by device B. Consequently, device A may calculate the round-trip time based on the indication received from device B (the time period arrow 420) and the turnaround time measured by device A (the time period arrow 410).

In the above example, the initial timestamps may not be of sufficient precision to provide the desired ranging accuracy (e.g., sub-foot accuracy). For example, the pulse detection scheme used to generate the initial timestamps may employ a conventional signal detection scheme (e.g., that detects a signal maximum). However, to achieve precise ranging measurements, received signal leading edge detection as taught herein may be employed.

Figure 5:
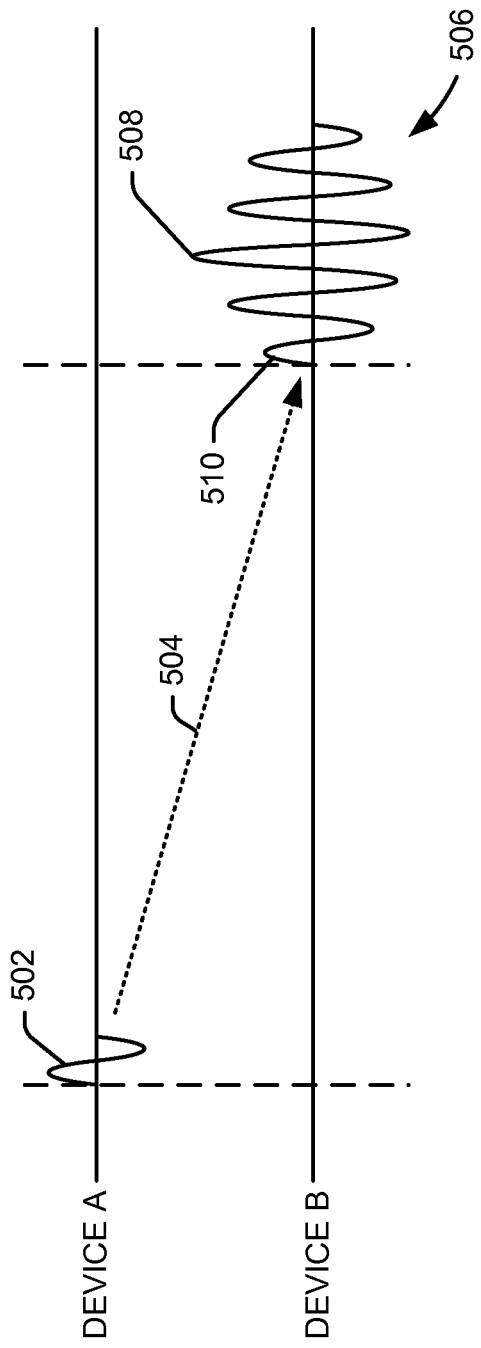
FIG. 5 is a simplified diagram illustrating an example of detection of a leading edge of a pulse.

FIG. 5 illustrates how leading edge detection may differ from conventional signal detection (e.g., which may be used by the devices A and B for data communication operations). Here, the device A sends a pulse 502 that is transmitted (as represented by arrow 504) to the device B. The pulse 506 represents the received pulse at device B. In conventional signal detection, the typical acquisition point may correspond to the strongest signal path. Thus, for data communication purposes, the pulse 506 may be acquired at or near point 508. Consequently, for a single path channel, an optimum threshold for determining time of arrival of a signal may be defined based on the maximum magnitude of the input signal.

In contrast, in a multi-path scenario (e.g., where a transmitted signal is refracted), the leading path (e.g., LOS path) of a pulse may or may not be the strongest path. For example, the LOS path may be attenuated by an obstruction in the path such that a reflected path (non-LOS path) may be the strongest path. Accordingly, a received signal may have multiple lobes where a leading lobe may have a lower peak amplitude than a later lobe. Similarly, a received signal may have multiple signal path components (but not have readily distinguishable lobes) where a leading signal path component may have a lower peak amplitude than the overall signal. Since the leading path may be weaker than other paths under any of these circumstances, detection of the strongest signal path may not identify the leading edge of the pulse.

In view of the above, it is desirable to locate the leading edge 510 of the pulse 506 to determine the signal propagation delay time with a high degree of accuracy for ranging. Advantageously, in such a case, it may be sufficient to only reconstruct the part of the signal that corresponds to the first path (i.e., the lobe associated with the first local maximum).

Figure 6:
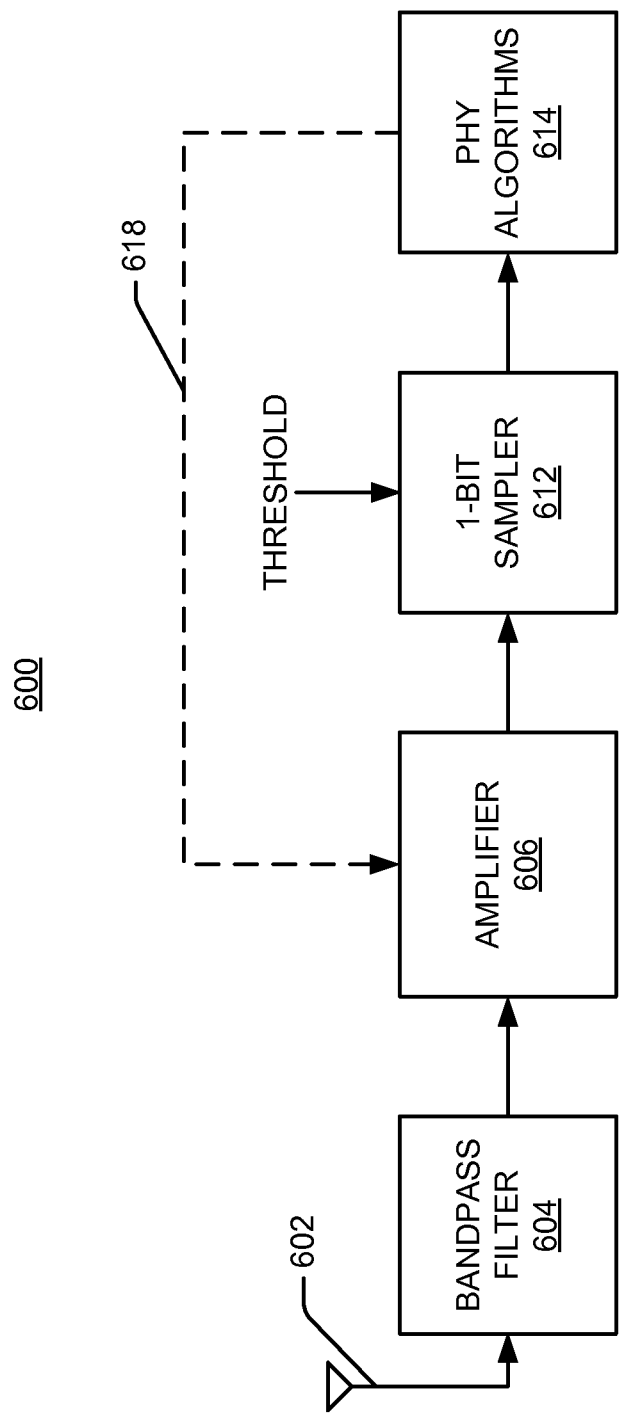
FIG. 6 is a simplified block diagram illustrating an example of receive chain components and receive signal processing algorithms.

FIG. 6 depicts sample components that may be employed in a wireless device 600 to receive signals (e.g., UWB pulses). In particular, the wireless device 600 comprises a receive chain including components 602-612, and PHY algorithms 614 that process samples provided by the receive chain and that control the operation of the receive chain.

At the receive chain, an RF signal received at an antenna 602 is filtered by a bandpass filter 604 and provided to one or more amplifiers as represented by amplifier 606 (e.g., comprising a variable gain amplifier). The amplifier 606 amplifies this signal based on a control signal 618. The output of the amplifier 606 is sent to a 1-bit sampler 612 (e.g., a 1-bit ADC or some other suitable sampler) that samples the signal at a defined rate. In some implementations, the sampler threshold may be set (e.g., via the amplifier 606) such that 9% of the received samples are equal to 1 in the absence of an input signal.

Different types of gain control may be employed in different implementations. For example, in noise-based gain control implementations, the gain control may be set to a fixed level for the reception of all signals (e.g., all ranging pulses) based on the received noise level that is measured by the receiver at a given point in time (e.g., when communication is established, at periodic times, and so on) on at least one communication channel. Thus, in these implementations, the PHY algorithms 614 may process the digital samples output by the sampler 612 to identify the current noise level, and set the gain control via the signal 618 accordingly.

In the receive architecture of FIG. 6, factors such as jitter and quantization may adversely affect the performance of the system. For example, the total jitter in an RF transmit/receive chain may be comparable to the propagation delay $T_P$. In accordance with the teachings herein, multiple pulses may be averaged to reduce the effect of the jitter. For example, the ranging algorithm may produce an estimate of the time of arrival of a received pulse by processing the samples (slices) of a number $N_P$ of successive transmitted pulses. In a sample implementation, an estimate of the time of arrival is computed in units of the slice sampling interval. As a specific example, signal reconstruction may be performed by averaging a set of pulses according to the following equation:

$$r(k) = \frac{1}{N_P} \sum_{P=1}^{N_P} s(p, k)$$

In the above equation, k is the slice index (e.g., k=1, 2, ..., 24), $N_P$ is the number of pulses, p is the pulse index (e.g., p=1, 2, ..., $N_P$), and $s(p, k) \in \{0, 1\}$.

Figure 7:
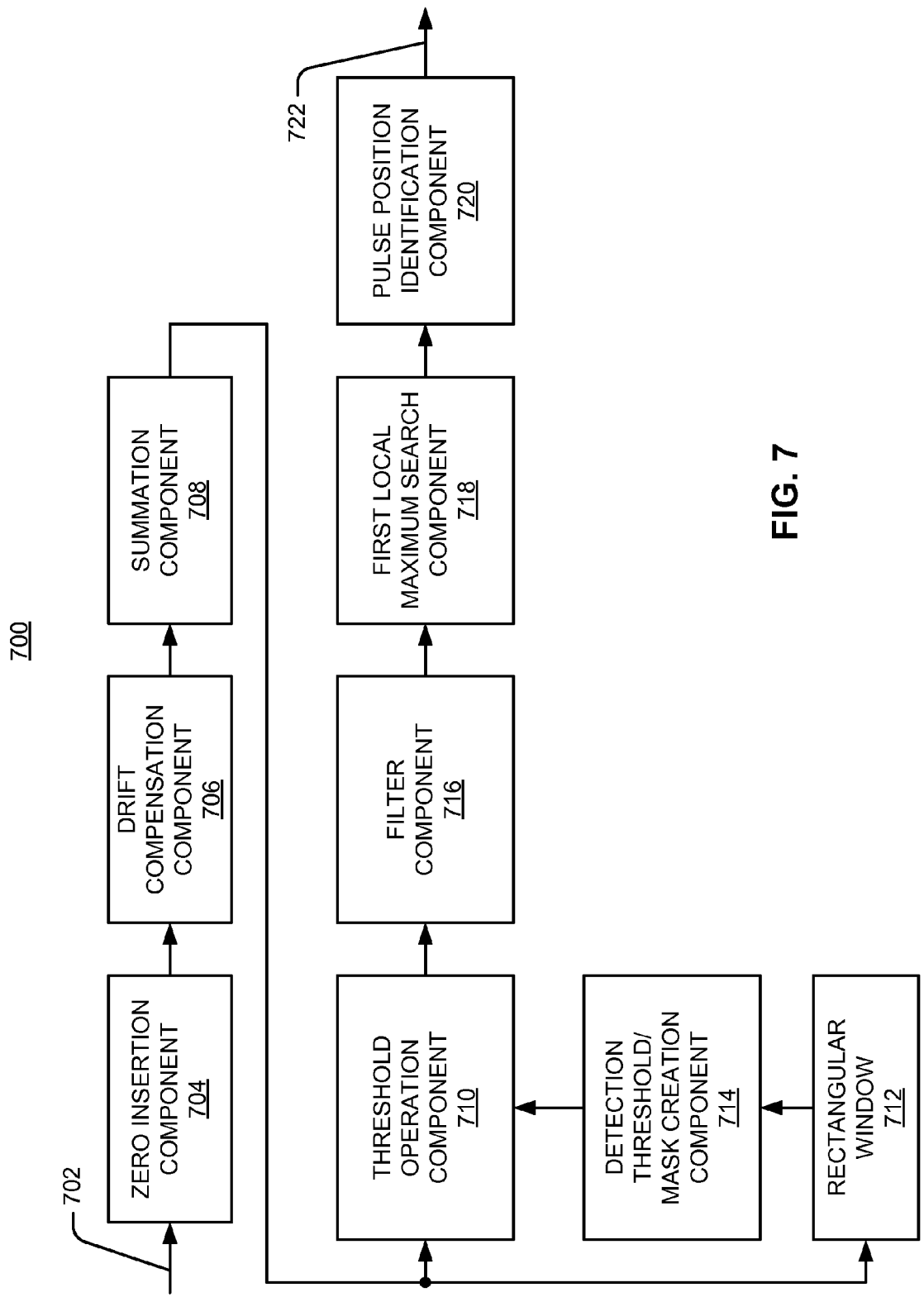
FIG. 7 is a simplified block diagram illustrating an example of components for identifying a leading edge based on post-drift compensation signal reconstruction.
Figure 8:
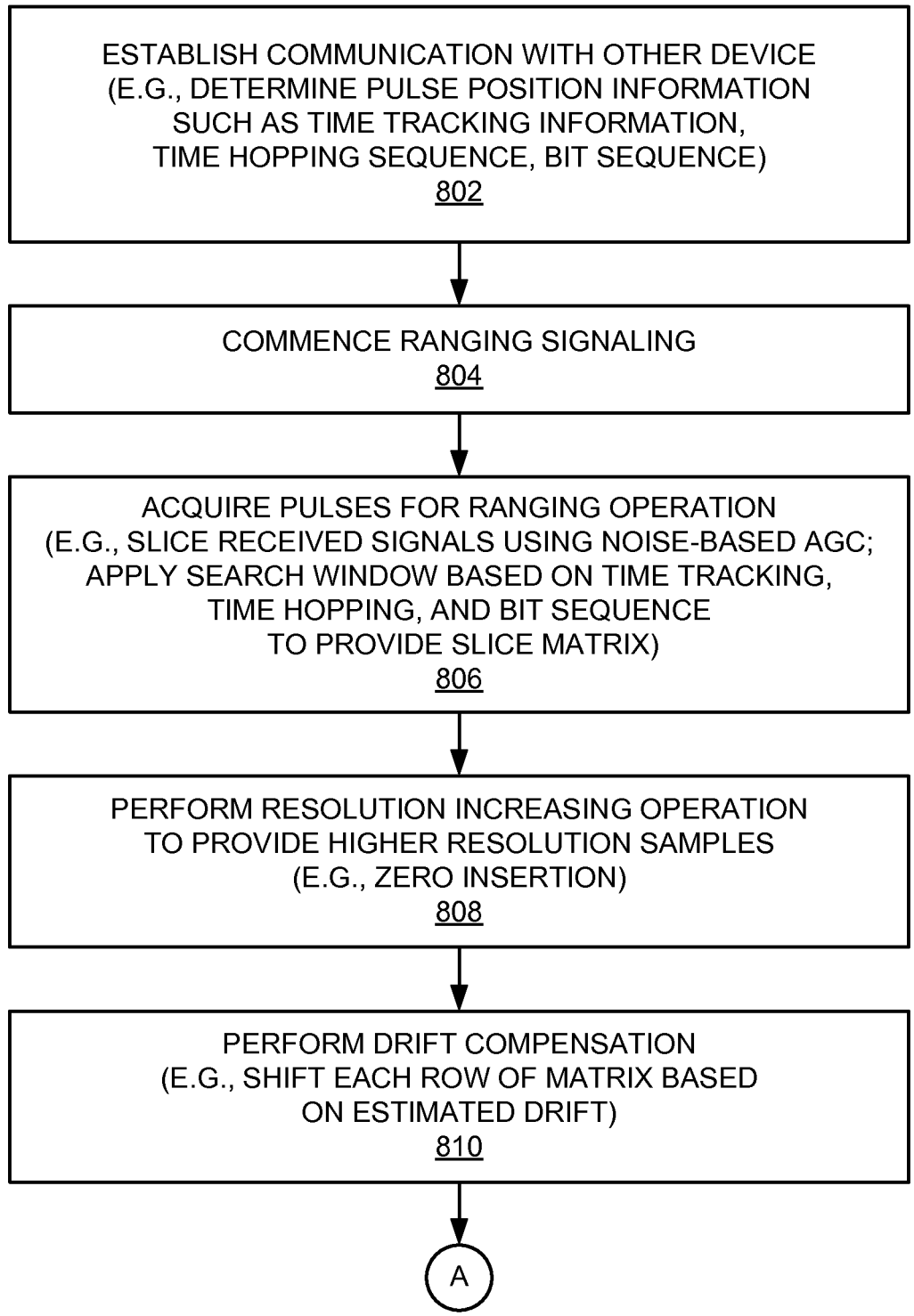
FIGS. 8 and 9 are a flowchart of several sample aspects of ranging-related operations that may be performed in conjunction with post-drift compensation signal reconstruction.
Figure 9:
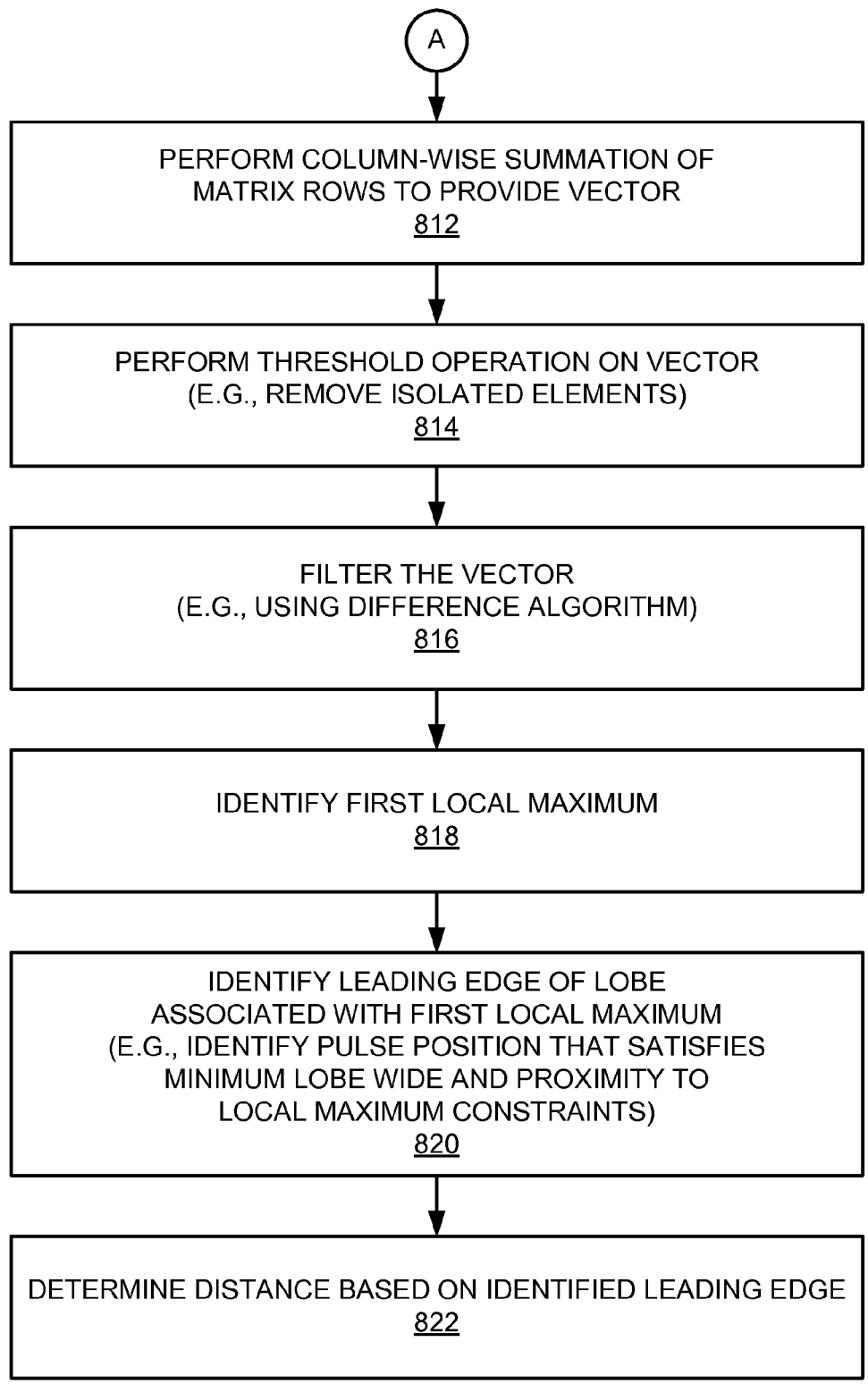

Referring now to FIGS. 7-9, examples of components and operations that may be employed in an implementation that provides post-drift compensation signal reconstruction will now be described. Referring initially to FIG. 7, the system 700 includes several components that perform leading edge detection operations based on an input (as represented by the line 702) provided by the receive chain.

In the example that follows, the input comprises the slices of a number (Np) of pulses that are transmitted as a set (e.g., in sequence). Assuming that a pulse is sent every 200 nanoseconds (ns) and that the slice (or sampling) interval is 0.7813 ns (i.e., 128 slices every 100 ns), the slices may be organized in a matrix Y with Np rows and 256 columns. Here, time tracking is enabled and the time tracking indications (e.g., drift estimate) that are used for receiving the slices are recorded for subsequent use.

To conserve power, the receiver is turned on during a search window for each pulse. Here, the timing and length of the search window is based on the expected width of the pulses and pulse timing (e.g., time hopping sequence and bit sequence). For example, a number Ns (e.g., Ns=24) of slices may be recorded for each pulse. Thus, an Np×Ns matrix Y_s (where s stands for small) with binary elements is formed with these slices. Here, the $k^{th}$ row of Y_s is formed by the slices obtained from the $k^{th}$ pulse. In a case where Ns is greater than the number of slices in one hop region, the receive window may start at the beginning of the hop interval and the extra slices may be recorded from the subsequent hop.

The elements of the matrix Y_s are processed according to the ranging algorithm implemented by the components of FIG. 7. Briefly, the algorithm implements a low pass filter procedure followed by a search for a first local maximum. The drift compensation step applies drift corrections to the oversampled waveform. A systematic error (e.g., with range −0.39 ns to +0.39 ns) may be eliminated in this way. The threshold operation eliminates noise samples that may produce local maxima. The length of the filter window is adapted to the maximum width of the received pulse in a single path channel. This long window produces a unique maximum in the filtered signal at a high signal-to-interference-plus-noise ratio (SINR) for the case where a fixed AGC setting produces a number of consecutive non-zero slices. The filtering operation is implemented using the difference coefficients (e.g., to simplify the implementation). The first local maximum search procedure enables detection of the first front in the proximity of the first local maximum. This helps eliminate a source of uncertainty if the variation of the signal around the local maximum is small.

Referring now to the specific components of FIG. 7, the zero insertion component 704 adds zeros to the matrix Y_s to enable subsequent operations to be performed at a higher resolution. For example, for each row in the Y_s matrix, 7 zeros may be added before the first slice, and after each slice (including the last slice). Thus, after zero insertion, each row of the Y_s matrix includes 199 "oversamples" in this example.

The drift compensation component 706 performs drift correction by shifting each row by a number given by the drift correction value. The inserted samples are set to zero and the samples that fall out of range are discarded. After the drift correction, a 64×199 matrix Y_s2 with binary elements is obtained. In some aspects, the correction information per pulse (in "oversample" units) is a function of the estimated drift and timing information (e.g., hopping sequence, ranging sequence, and pulse index). For example, the drift correction value may be given by: estimated_drift_rx=(sum(Ttrk_ind(1:128))/128), where Ttrk_ind( ) is the time tracking indication (e.g., a value or −1, 0, or 1) for a given slice. The shift applied to each row is given by: Shift_applied(row_index)=−floor (((row_index-1)*256*+Hop_seq(row_index)*16+Rng_seq (row_index)*256)*f_ovs*estimated_drift_rx). Here, floor( ) corresponds to a quantization floor, Hop_seq( ) corresponds to the time hopping sequence (e.g., a value of: 0, 1, . . . , 7), Rng_seq( ) corresponds to the ranging sequence (e.g., a value of 0 or 1), f_ovs corresponds to the interpolation order (e.g., a default value of 8), and estimated_drift_rx corresponds to the estimated drift.

The summation component 708 sums the elements of the matrix Y_s2 in a column-wise manner to provide a vector y that has 199 elements. Here, each element of the vector y indicates how many "1s" are in the corresponding column of the Y_s2 matrix. Thus, the vector y comprises a reconstruction of the received signal. In a sample implementation, each of the elements of the vector y is represented on 6 bits with saturation (a value of 64 is represented as 63). In the presence of drift, it is unlikely that a value of 64 is obtained.

The threshold operation component 710 discards all elements of y that appear "isolated". Thus, for k=1:199, if sum (y(k:min(k+AWin_len−1, 199)))<d_thr, then set y(k)=0. Here, a detection threshold/mask creation component 714 may provide a threshold or mask used for the thresholding operation based on a rectangular window 712 derived from the vector y. If the signal obtained after the thresholding procedure is null, an indication that the detection has failed is set and the procedure is aborted.

After thresholding, the vector y is operated on by a filter component 716 (e.g., a low-pass filter), followed by a first local maximum search component 718 that identifies the first local maximum of the vector y (the reconstructed signal). An alternate implementation of this procedure is to store directly the difference between successive filter coefficients and to apply this new filter to the received signal. In some implementations the low-pass filter is obtained using a Blackman Harris window. In this case, the filter coefficients vary smoothly.

One advantage of this approach is the range of the result of the filtering operation. Here, since the first local maximum is obtained by searching for a change of sign of the result, the additions may be done with saturation. The result of the filtering operation is denoted by y_lpf_diff and is stored using 8 bits representation, with the range [−1, . . . 1-1/128].

The pulse position identification component 720 identifies a pulse position corresponding to the time-of-arrival of the leading edge. Since the differential-based example identifies the variation of the filtered signal, the pulse position may be given by an index k_s that satisfies certain minimum lobe width and proximity to local maximum conditions. An example of a minimum lobe width condition is as follows: for each k=k_s−m_lobe:k_s−1, y_lpf_diff(k)>thr_slope. An example of a proximity to local maximum condition is as follows: y_lpf_diff(k_s)<e_slope and y_lpf_diff(k_s−1)>e_slope. The parameter m_lobe (e.g., specifying the minimum lobe half width) imposes a threshold on the width of the pulse. Thus, m_lobe may be used to avoid detecting local maxima produced by noise. The parameter e_slope allows the position of the pulse to be determined as a front close to the first local maximum. In this example, e_slope specifies the minimum slope where the search for a maximum stops. The parameter thr_slope specifies to the minimum slope used to measure the width of the half lobe. An advantage of this scheme is that the variance of the detected pulse position is reduced for those situations where the communication channel has two or more paths close to each other.

Additional details relating to operations that may be performed by the components of FIG. 7 or other suitable components in the context of a ranging operation will now be described with reference to the flowchart of FIGS. 8 and 9. These operations are described from the perspective of a device that identifies the leading edge of a signal received from another device.

As represented by block 802 of FIG. 8, at some point in time, communication is commenced between the devices. For example, the devices may initially initiate a two-way ranging operation to determine the distance between the two devices, or the devices may initially establish communication then commence a two-way ranging operation.

In conjunction with establishing this communication, each device acquires information that enables that device to determine when pulses are expected to be received from the other device. For example, each device may determine the time hopping sequence and ranging sequence to be used for inter-device communication. In addition, one or more of the devices may employ a time tracking algorithm to compensate for any relative clock drift between the two devices. Also, in an implementation that uses noise-based AGC, the receiver AGC level may be determined and set prior to or during the initiation of communication.

As represented by block 804, the devices negotiate to commence a ranging operation and then send their respective ranging signals for the ranging measurements.

As represented by block 806, each device then acquires pulses for its respective ranging measurement operation. As discussed above, this may involve slicing the received pulses, and applying a search window based on the time tracking, time hopping, and bit sequence to provide a slice matrix (e.g., Y_s). In addition, as discussed herein, a timestamp may be generated to indicate the approximate time of receipt of one or more of these pulses.

As represented by block 808, each device performs a resolution increasing operation on its acquired slices to facilitate higher resolution drift compensation and leading edge detection. This may involve zero insertion or some other suitable operation that increases the number of slices for subsequent operations.

As represented by block 810, each device performs drift compensation on the higher resolution slices. For example, as discussed above, each row (e.g., a set of samples) of the matrix Y_s may be shifted based on a drift estimate provided by the time tracking algorithm. For example, the drift compensation algorithm may generate a drift estimate that indicates the amount of drift per unit of time. This drift estimate may then be used to determine the amount of a time shift that needs to be applied to a given pulse (e.g., based on the time at which that pulse was received).

As represented by block 812 of FIG. 9, each device performs a column-wise summation of the matrix rows to provide the vector y. It should be appreciated that a reconstruction of the received signal (e.g., of a given pulse) may be generated in other ways consistent with the teachings herein.

As represented by block 814, each device performs a threshold operation on its respective vector. In this way, isolated elements may be removed from the vector to reduce the likelihood of a noise-induced local maximum being identified at a later stage of the procedure.

As represented by blocks 816 and 818, each device filters its respective vector and identifies the first local maximum of the vector (the reconstructed signal). As discussed herein, this first local maximum typically corresponds to the signal lobe of the signal that traversed the line-of-sight path between the devices. Hence, the time of receipt of this signal lobe may be used to accurately determine the distance between the devices.

As represented by block 820, each device identifies the leading edge of the lobe associated with the corresponding identified first local maximum. As discussed above in conjunction with FIG. 7, in some implementations identification of the time-of-arrival of the leading edge involves identifying the pulse position that satisfies minimum lobe width and proximity to local maximum constraints. Other criteria may be employed in other implementations. For example, the time-of-arrival may be defined as the time that corresponds to a certain amplitude percentage of the leading edge of the lobe (e.g., 50% corresponds to the middle of the leading edge). As discussed herein, this leading edge information may then be used in conjunction with the preliminary timestamp recorded for a specified pulse to provide a more accurate estimate of the time-of-arrival of that pulse.

As represented by block 822, one or both of the devices may then determine the distance between the devices based on the time-of-arrival information generated by each device. For example, one device may send its time-of-arrival information (e.g., $T_{4B}-T_{1B}$) to the other device, whereupon the other device calculates the distance as described herein.

Figure 10:
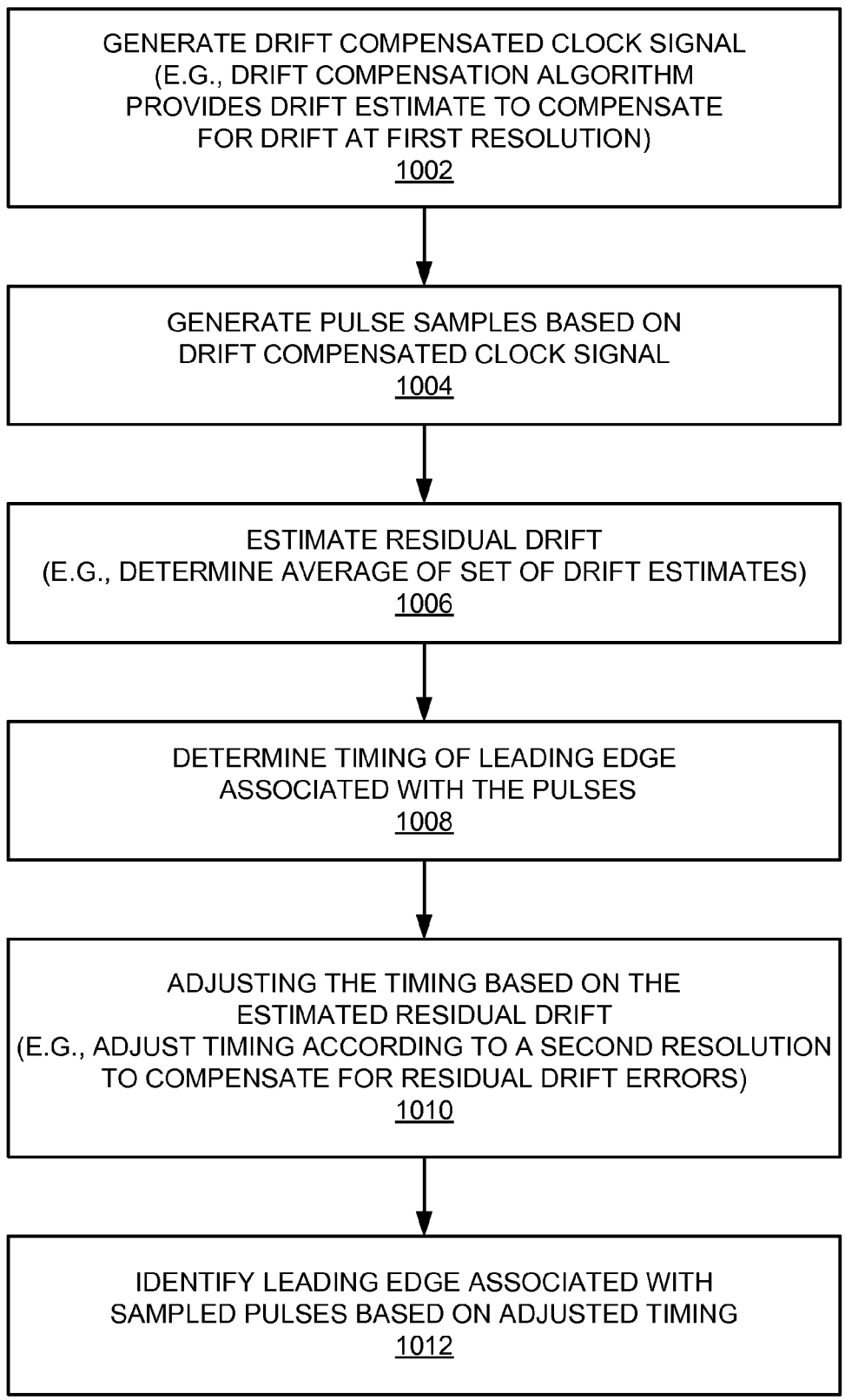
FIG. 10 is a flowchart of several sample aspects of drift compensation-related operations that may be performed in conjunction with adjusting timing based on estimated residual drift.

Referring now to FIG. 10, in some cases, the time-of-arrival estimate may be affected by the relative clock drift between the devices. For example, each device (hereafter devices A and B) will have its own clock, with period $T_A$ and $T_B$, respectively. Typically, the clocks of the two devices do not have the same period, i.e., $T_B=T_A*(1+D)$. Here, D is the clock drift of device B with respect to device A. FIG. 10 describes a sample drift compensation algorithm that may be employed to mitigate (e.g., eliminate) the effect of such clock drift.

Drift-induced bias is an effect that may be present even when a time tracking algorithm is employed. For example, residual drift may be present when the time tracking corrections are quantized at the sample level, while the ranging algorithm oversamples the received waveform (to produce a more precise estimate). For example, if the drift is large enough, a systematic error of 0.5 samples (e.g., which may translates to a ranging error of 15 cm) may be introduced in the absence of a residual drift compensation algorithm. The drift compensation algorithm of FIG. 10 uses an average of the fine shift estimation of each received pulse to create an average value.

As represented by block 1002, a device generates a drift-compensated clock signal that is used to provide time tracking corrections at the sample level. For example, a drift compensation algorithm may generate a drift estimate that is, in turn, used to adjust a timing signal that determines when to shift the timing of the signal samples (slices) due to drift. Here, it should be appreciated that this time shifting is performed according to a first resolution (i.e., corresponding to the slicing interval). Thus, in some aspects, the generation of a drift compensated clock signal may comprise adjusting a drift compensated clock signal for clock drift according to a first timing resolution. As discussed below, the drift compensation algorithm may generate an accumulated drift count value (e.g., based on an estimate of the accumulated drift over time) that indicates, for example, the time shift that is to be applied to current slices.

Thus, as represented by block 1004, the device generates pulse samples based on the drift-compensated clock signal. For example, given a time instant t, we may denote by $n_A(t)=[t/T_A]$, the counter corresponding to the last slice instance of the device A before the time instant t. In the ranging algorithm, the device A transmits a sequence of pulses, each pulse starting at a moment given by a number $n_A[k]$, where $k=1,\ldots,N_p$. The numbers $n_A[k]$ are known by the device B which switches on its receiver to capture these pulses.

As discussed below, at the commencement of ranging operations, a record of the current accumulated drift count value may be maintained (i.e., stored in memory) for use in the leading edge estimation calculation upon completion of the ranging pulse acquisition operation. The accumulated drift count value is then reset to zero to simplify the estimation of the residual drift during the ranging pulse acquisition operation.

As represented by block 1006, the device B estimates the residual drift. For example, the device B may determine a set of drift estimates corresponding to a set of the received pulses, and then determine an average (e.g., the mean) of the drift estimates. A detailed example of a residual drift estimation scheme follows.

Device B has a drift estimate $D_B$ which is used to adjust its own slice counter. The accumulator of the time tracking loop (e.g., the accumulated drift count value mentioned above) may have an initial value: $b_0 \in [0,1]$. In other words, to receive a pulse that is transmitted by A at $T_A n_A$, B starts the reception at: $n_B = n_A - \lfloor n_A D_B + b_0 \rfloor$.

The difference between the reception time and the transmission time is:

$$\Delta t = n_B T_B - n_A T_A = T_A(n_A D - \lfloor n_A D_B + b_0 \rfloor D - \lfloor n_A D_B + b_0 \rfloor)$$

$$\Delta t \approx T_A(n_A D - \lfloor n_A D_B \rfloor) = T_A(n_A D_B - \lfloor n_A D_B + b_0 \rfloor) + T_A n_A (D - D_B)$$

The approximation for $\Delta t$ involves ignoring the second order terms, given that the drift is likely a very small quantity (e.g., $D \in [-300\times10^{-6}, 300\times10^{-6}]$.). The error $\Delta t$ contains two terms. The first term consists of variables that are known by B and thus may be computed and cancelled from a final result. The second term depends on the drift error and introduces a systematic error.

As described above, the ranging algorithm may use a sequence of a defined number of pulses. Accordingly, assume for simplicity that $n_A[k]=kN_0$, where $N_0$ is the number of slices between two successive pulses. In this case:

$$\Delta t[k] \approx T_A(kN_0 D_B - \lfloor kN_0 D_B + b_0 \rfloor) + T_A kN_0(D-D_B)$$

Roughly, the ranging algorithm uses an average of the received pulses for position estimation, which means that a good measure of the error introduced by the drift can be obtained by averaging the errors introduced to each pulse. Denote the first term of $\Delta t[k]$ by:

$$\epsilon_F[k] = T_A(kN_0 D_B - \lfloor kN_0 D_B + b_0 \rfloor)$$

In general, the effect of $\epsilon_F[k]$ is correctable. However, the initial value of $b_0$ and the drift may influence the distribution of the error introduced for different received pulses. This may slightly increase the variance of the estimate or, in multiple threshold quantization scenarios, may affect the final result, depending on how the detection is done (e.g., if for detection only a fraction of the received pulses are used, then the error applies only to those pulses). An alternate solution to this problem is changing the threshold every pulse.

To address this issue, $b_0$ is reset at the beginning of the reception of pulses and at the beginning of transmission of pulses (for ranging on the reverse link). At the start of transmission, the value of $b_0$ is recorded and used in the final leading edge time-of-arrival estimate.

The simplified drift correction formula is thus given by:

$$\varepsilon_{CORR} = \sum_k \varepsilon_F[k]$$

The formula of $\varepsilon_F[k]$ also may be adjusted as a function of the position of the received pulses. Thus, the resulting value may depend on the hopping pattern and on the symbol value ('0' or '1').

Referring again to FIG. 10, as represented by block 1008, in conjunction with a ranging operation, the device B determines the timing of a leading edge associated with pulses sampled at block 1004. As discussed above, this initial timing estimate corresponds to the first timing resolution (based on the slicing interval). Also as discussed above, the determination of this timing may be based on the accumulated drift count value that was recorded prior to the commencement of the ranging operations.

As represented by block 1010, the device B adjusts the determined timing based on the estimated residual drift calculated at block 1006. Advantageously, this timing adjustment is made according to the second timing resolution, which is higher than the first timing resolution. Consequently, the device B may more accurately identify the leading edge associated with the sample pulses (e.g., identify the time-of-arrival of the leading edge of the first pulse) based on the adjusted timing (block 1012). Thus, in some aspects, the adjustment of the timing according to the second timing resolution compensates for residual drift error associated with at least one clock drift adjustment made according to the first timing resolution.

Figure 11:
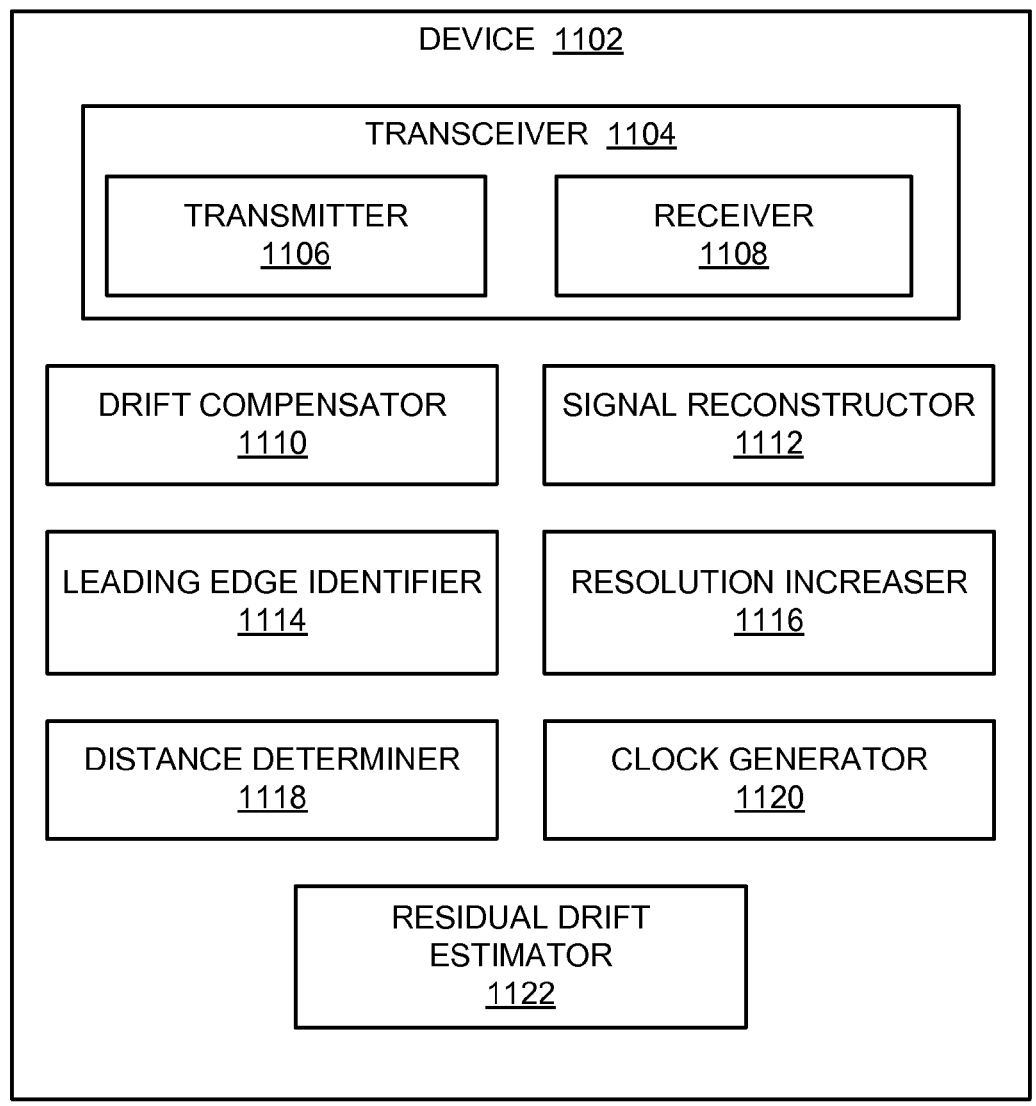
FIG. 11 is a simplified block diagram of several sample aspects of components that may be employed in communication nodes.

FIG. 11 illustrates several sample components that may be incorporated into a device 1102 (e.g., corresponding to device 102, 104, 302, or 304) for providing leading edge detection and other functionality as discussed herein. In particular, these components may be configured to provide functionality as described above in conjunction with FIGS. 1-10. In should be appreciated that these components or other similar components may be incorporated into other devices in a system. For example, both devices that participate in a two-way ranging operation may employ leading edge detection as taught herein. Also, the functionality of any of the components of a given device as described herein may be implemented as one component or more than one component.

As shown in FIG. 11, the device 1102 includes a transceiver 1104 for communicating with another device (or several other devices, not shown). The transceiver 1104 includes a transmitter 1106 for transmitting signals (e.g., pulses, packets, messages, information, and so on) and a receiver 1108 for receiving signals (e.g., receiving signals, then sampling those signals, and so on).

The device 1102 includes other components that provide functionality relating to the leading edge detection and other operations described herein. For example, a drift compensator 1110 provides functionality relating to detecting and/or compensating for clock drift (e.g., generating a drift compensated signal, generating an accumulated drift count value, maintaining a record of the accumulated drift count value, resetting the accumulated drift count value). A signal reconstructor 1112 provides functionality relating to generating a reconstruction of a received signal based on samples of the signal (e.g., reconstructing a received signal based on a drift compensated signal). A leading edge identifier 1114 provides functionality relating to identifying a leading edge associated with a received signal (e.g., identifying a leading edge of a received signal wherein the identification is based on a reconstructed signal, identifying a first local maximum, identifying timing of a leading edge of a signal lobe associated with the first local maximum, determining timing of a leading edge, adjusting the determined leading edge timing, using a maintained record of an accumulated drift count value to identify a leading edge). A resolution increaser 1116 provides functionality relating to increasing the resolution of samples (e.g., increasing the resolution of samples to generate higher resolution samples (e.g., via zero insertion)). A distance determiner 1118 provides functionality relating to determining a distance between two apparatuses (e.g., determining a distance based on an estimated time of arrival of a leading edge). A clock generator 1120 provides functionality relating to providing one or more clock-related signals (e.g., generating a drift compensated clock signal). A residual drift estimator 1122 provides functionality relating to estimating a residual drift (e.g., estimating a residual drift associated with a set of pulses).

For purposes of illustration, the device 1102 is shown in FIG. 11 as including components that may be used in the various examples described herein. In practice, one or more of the illustrated components may not be used in a given implementation. As an example, in some implementations the device 1102 may not include the residual drift estimator 1122.

In some implementations the components of FIG. 11 may be implemented in one or more processors (e.g., that uses and/or incorporates data memory for storing information or code used by the processor(s) to provide this functionality). For example, some of the functionality of block 1104 and some or all of the functionality of blocks 1110-1122 may be implemented by a processor or processors of a given device and data memory of that device (e.g., by execution of appropriate code and/or by appropriate configuration of processor components).

Figure 12:
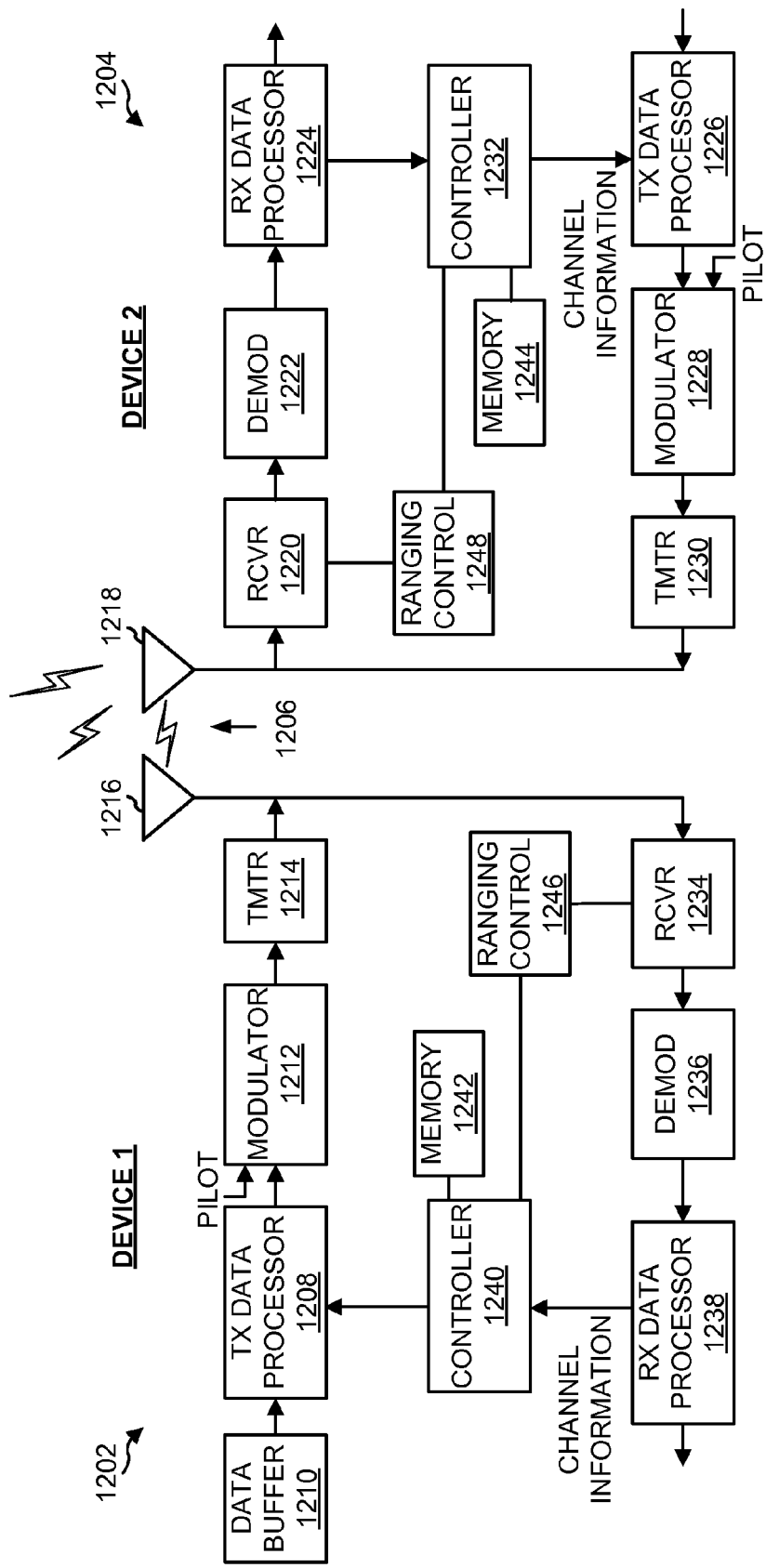
FIG. 12 is a simplified block diagram of several sample aspects of communication components.

The teachings herein may be incorporated into a device employing various components for communicating with at least one other device. FIG. 12 depicts several sample components that may be employed to facilitate communication between devices. Here, a first device 1202 and a second device 1204 are adapted to communicate via a wireless communication link 1206 over a suitable medium.

Initially, components involved in sending information from the device 1202 to the device 1204 will be treated. A transmit (TX) data processor 1208 receives traffic data (e.g., data packets) from a data buffer 1210 or some other suitable component. The transmit data processor 1208 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 1212 receives the data symbols, pilot symbols, and possibly signaling for a link, and performs modulation (e.g., OFDM or some other suitable modulation) and/or other processing as specified by the system, and provides a stream of output chips. A transmitter (TMTR) 1214 processes (e.g., converts to analog, filters, amplifies, and frequency upconverts) the output chip stream and generates a modulated signal, which is then transmitted from an antenna 1216.

The modulated signals transmitted by the device 1202 (along with signals from other devices in communication with the device 1204) are received by an antenna 1218 of the device 1204. A receiver (RCVR) 1220 processes (e.g., conditions and digitizes) the received signal from the antenna 1218 and provides received samples. A demodulator (DEMOD) 1222 processes (e.g., demodulates and detects) the received samples and provides detected data symbols, which may be a noisy estimate of the data symbols transmitted to the device 1204 by the other device(s). A receive (RX) data processor 1224 processes (e.g., symbol demaps, deinterleaves, and decodes) the detected data symbols and provides decoded data associated with each transmitting device (e.g., device 1202).

Components involved in sending information from the device 1204 to the device 1202 will now be described. At the device 1204, traffic data is processed by a transmit (TX) data processor 1226 to generate data symbols. A modulator 1228 receives the data symbols, pilot symbols, and signaling for a link, performs modulation (e.g., OFDM or some other suitable modulation) and/or other pertinent processing, and provides an output chip stream, which is further conditioned by a transmitter (TMTR) 1230 and transmitted from the antenna 1218. In some implementations signaling for a link may include power control commands and other information (e.g., relating to a communication channel) generated by a controller 1232 for all devices (e.g. terminals) transmitting on the link to the device 1204.

At the device 1202, the modulated signal transmitted by the device 1204 is received by the antenna 1216, conditioned and digitized by a receiver (RCVR) 1234, and processed by a demodulator (DEMOD) 1236 to obtain detected data symbols. A receive (RX) data processor 1238 processes the detected data symbols and provides decoded data for the device 1202 and the link signaling. A controller 1240 may receive power control commands and other information to control data transmission and to control transmit power on the link to the device 1204.

The controllers 1240 and 1232 direct various operations of the device 1202 and the device 1204, respectively. For example, a controller may determine an appropriate filter, reporting information about the filter, and decode information using a filter. Data memories 1242 and 1244 may store program codes and data used by the controllers 1240 and 1232, respectively.

FIG. 12 also illustrates that the communication components may include one or more components that perform ranging control operations as taught herein. For example, a ranging control component 1246 may cooperate with the receiver 1234 and/or other components of the device 1202 to receive a signal from another device (e.g., device 1204) and to identify a leading edge associated with that signal. Similarly, a ranging control component 1248 may cooperate with the receiver 1220 and/or other components of the device 1204 to receive a signal from another device (e.g., device 1202) and to identify a leading edge associated with that signal. It should be appreciated that for each device 1202 and 1204 the functionality of two or more of the described components may be provided by a single component. For example, a single processing component may provide the functionality of the ranging control component 1246 and the controller 1240 and a single processing component may provide the functionality of the ranging control component 1248 and the controller 1232.

A device constructed in accordance with the teachings herein may include various components that perform functions as a result of the detection of a leading edge (e.g., as result of determining that the distance from the device to another device is less than, equal to, or greater than a defined distance). For example, a headset may include a transducer adapted to provide an audio output as a result of the identification of a leading edge. A watch may include a user interface adapted to provide an indication as a result of the identification of a leading edge. A sensing device may include a sensor adapted to provide data to be transmitted as a result of the identification of a leading edge.

A wireless device may communicate via one or more wireless communication links that are based on or otherwise support any suitable wireless communication technology. For example, in some aspects a wireless device may associate with a network. In some aspects the network may comprise a personal area network (e.g., supporting a wireless coverage area on the order of 30 meters) or a body area network (e.g., supporting a wireless coverage area on the order of 10 meters) implemented using ultra-wideband technology or some other suitable technology. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

In some aspects a wireless device may communicate via an impulse-based wireless communication link. For example, an impulse-based wireless communication link may utilize ultra-wideband pulses that have a relatively short length (e.g., on the order of a few nanoseconds or less) and a relatively wide bandwidth. In some aspects the ultra-wideband pulses may have a fractional bandwidth on the order of approximately 20% or more and/or have a bandwidth on the order of approximately 500 MHz or more.

The teachings herein may be incorporated into (e.g., implemented within or performed by) a variety of apparatuses (e.g., devices). For example, one or more aspects taught herein may be incorporated into a phone (e.g., a cellular phone), a personal data assistant (PDA), an entertainment device (e.g., a music or video device), a headset (e.g., headphones, an earpiece, etc.), a microphone, a medical sensing device (e.g., a sensor such as a biometric sensor, a heart rate monitor, a pedometer, an EKG device, a smart bandage, a vital signal monitor, etc.), a user I/O device (e.g., a watch, a remote control, a switch such as a light switch, a keyboard, a mouse, etc.), an environment sensing device (e.g., a tire pressure monitor), a monitor that may receive data from the medical or environment sensing device, a computer, a point-of-sale device, an entertainment device, a hearing aid, a set-top box, a gaming device, or any other suitable device. The communication devices described herein may be used in any type of sensing application, such as for sensing automotive, athletic, and physiological (medical) responses. Any of the disclosed aspects of the disclosure may be implemented in many different devices. For example, in addition to medical applications as discussed above, the aspects of the disclosure may be applied to health and fitness applications. Additionally, the aspects of the disclosure may be implemented in shoes for different types of applications. There are other multitudes of applications that may incorporate any aspect of the disclosure as described herein.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses). As an example, in some implementations the width of each pulse may be on the order of 1 nanosecond or less (e.g., 100 picoseconds), while the pulse repetition interval may be on the order of 100 nanoseconds to 10 microseconds. It should be appreciated that these numbers are merely representative and that a given impulse-based system may employ different pulse widths and/or pulse repetition intervals.

Various types of modulation schemes may be used with an impulse-based signaling scheme. For example, some implementations may employ pulse position modulation (PPM). In addition, some implementations may employ pulse time hopping (e.g., based on pseudorandom sequence).

In some aspects a wireless device may comprise an access device (e.g., an access point) for a communication system. Such an access device may provide, for example, connectivity to another network (e.g., a wide area network such as the Internet or a cellular network) via a wired or wireless communication link. Accordingly, the access device may enable another device (e.g., a wireless station) to access the other network or some other functionality. In addition, it should be appreciated that one or both of the devices may be portable or, in some cases, relatively non-portable. Also, it should be appreciated that a wireless device also may be capable of transmitting and/or receiving information in a non-wireless manner (e.g., via a wired connection) via an appropriate communication interface.

Figure 13:
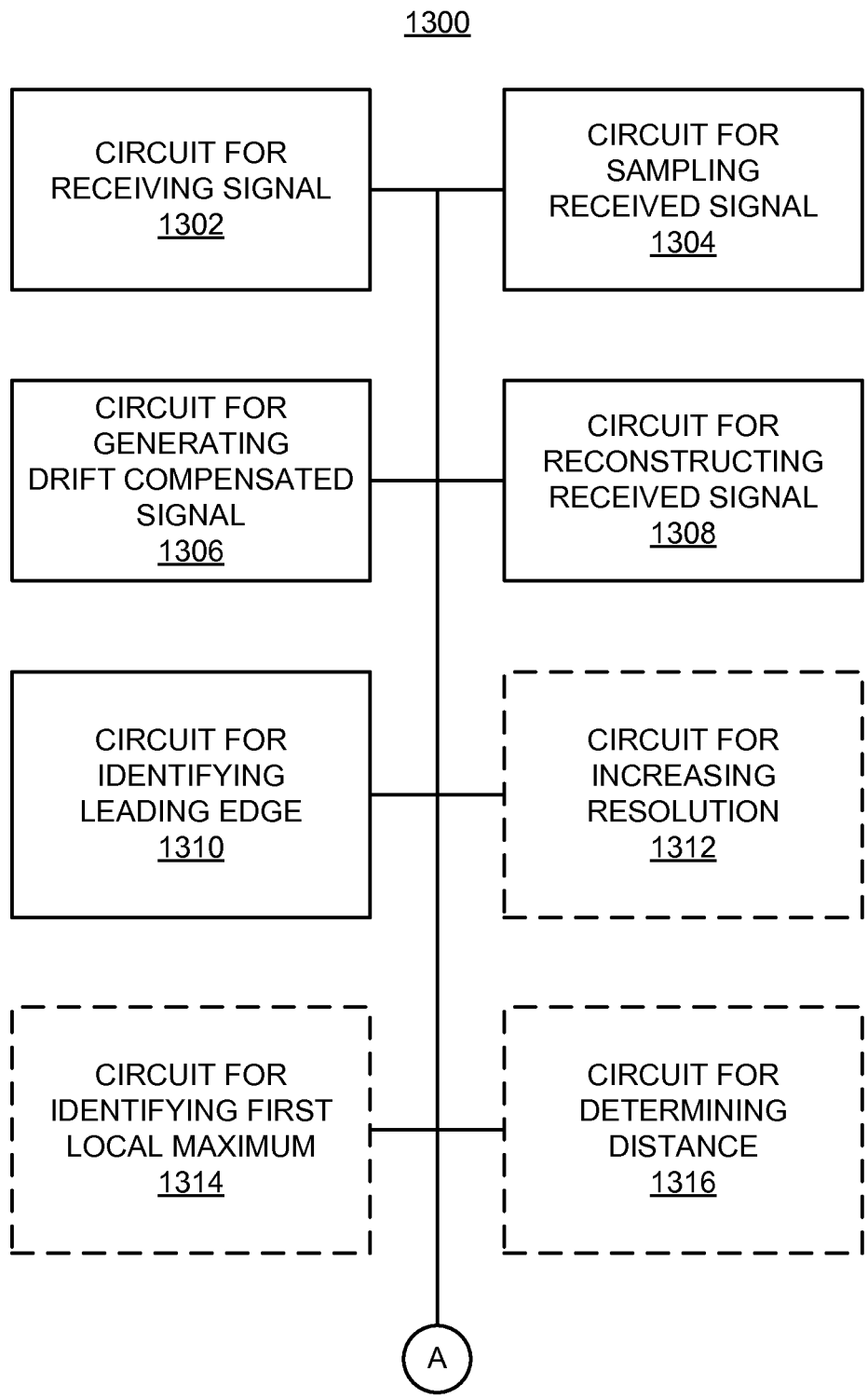
FIGS. 13-14 are simplified block diagrams of several sample aspects of an apparatus configured to identify a leading edge as taught herein.
Figure 14:
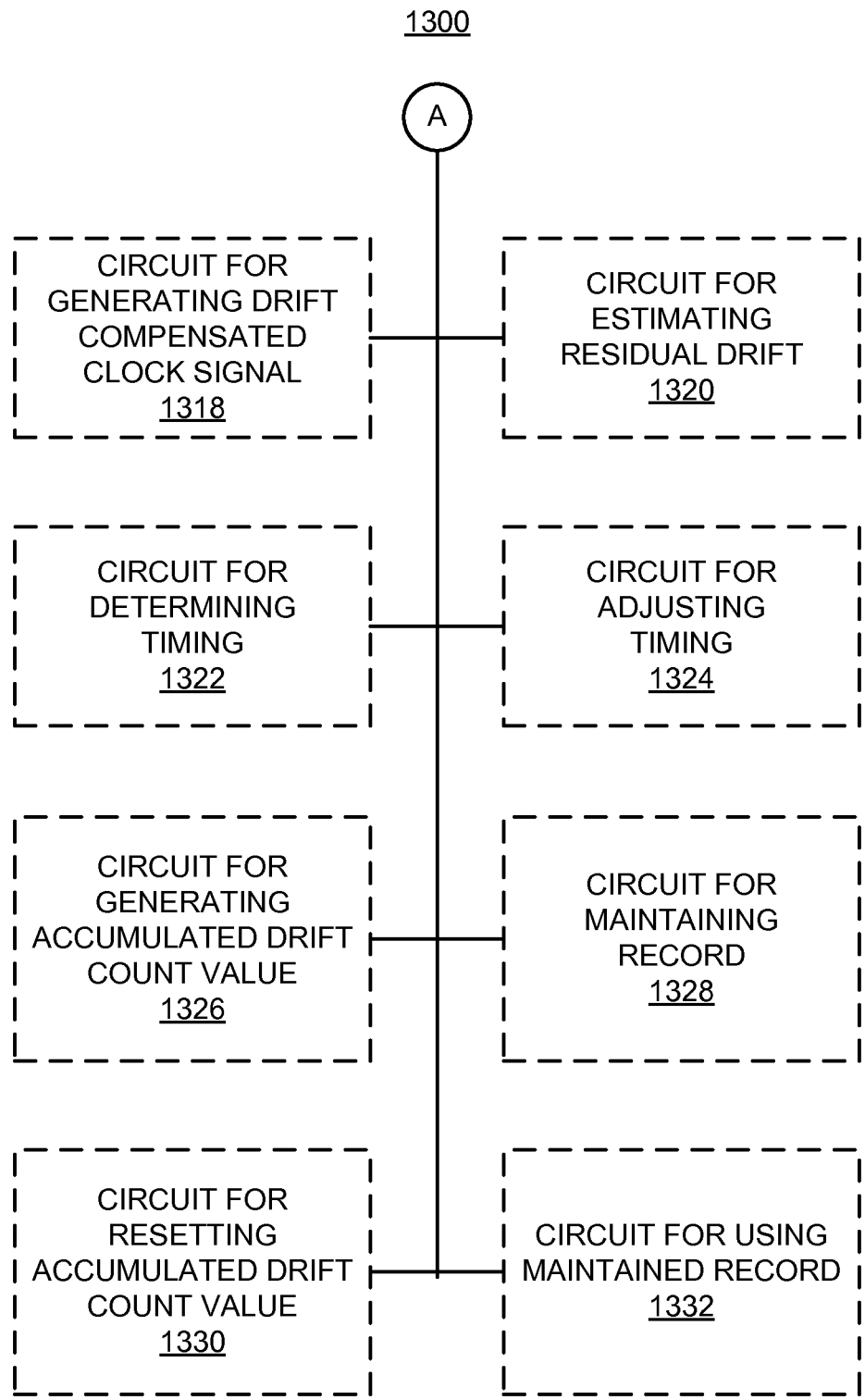

The components described herein may be implemented in a variety of ways. Referring to FIGS. 13 and 14, an apparatus 1300 is represented as a series of interrelated functional blocks that may represent functions implemented by, for example, one or more circuits (e.g., an integrated circuit such as an ASIC) or may be implemented in some other manner as taught herein. As discussed herein, a circuit may include a processor, software, other components, or some combination thereof The apparatus 1300 may include one or more modules that may perform functionality as described herein (e.g., with regard to one or more of the accompanying figures) and that may correspond in some aspects to similarly designated "means for" functionality in the appended claims. For example, means for receiving a signal (e.g., a circuit for receiving signal 1302) may correspond to, for example, a receiver as discussed herein and may be implemented as, for example, a processor or an ASIC. Means for sampling the received signal (e.g., a circuit for sampling received signal 1304) may correspond to, for example, a receiver as discussed herein and may be implemented as, for example, a processor or an ASIC. Means for generating a drift compensated signal (e.g., a circuit for generating drift compensated signal 1306) may correspond to, for example, a drift compensator as discussed herein and may be implemented as, for example, a processor or an ASIC. Means for reconstructing the received signal (e.g., a circuit for reconstructing received signal 1308) may correspond to, for example, a signal reconstructor as discussed herein and may be implemented as, for example, a processor or an ASIC. Means for identifying a leading edge (e.g., a circuit for identifying leading edge 1310) may correspond to, for example, a leading edge identifier as discussed herein and may be implemented as, for example, a processor or an ASIC. Means for increasing resolution (e.g., a circuit for increasing resolution 1312) may correspond to, for example, a resolution increaser as discussed herein and may be implemented as, for example, a processor or an ASIC. Means for identifying a first local maximum (e.g., a circuit for identifying first local maximum 1314) may correspond to, for example, a leading edge identifier as discussed herein and may be implemented as, for example, a processor or an ASIC. Means for determining a distance (e.g., a circuit for determining distance 1316) may correspond to, for example, a distance determiner as discussed herein and may be implemented as, for example, a processor or an ASIC. Means for generating a drift compensated clock signal (e.g., a circuit for generating drift compensated clock signal 1318) may correspond to, for example, a clock generator as discussed herein and may be implemented as, for example, a processor or an ASIC. Means for estimating a residual drift (e.g., a circuit for estimating residual drift 1320) may correspond to, for example, a residual drift estimator as discussed herein and may be implemented as, for example, a processor or an ASIC. Means for determining timing of the leading edge (e.g., a circuit for determining timing 1322) may correspond to, for example, a leading edge identifier as discussed herein and may be implemented as, for example, a processor or an ASIC. Means for adjusting the timing (e.g., a circuit for adjusting timing 1324) may correspond to, for example, a leading edge identifier as discussed herein and may be implemented as, for example, a processor or an ASIC. Means for generating an accumulated drift count value (e.g., a circuit for generating accumulated drift count value 1326) may correspond to, for example, a drift compensator as discussed herein and may be implemented as, for example, a processor or an ASIC. Means for maintaining a record of the accumulated drift count value (e.g., a circuit for maintaining record 1328) may correspond to, for example, a drift compensator as discussed herein and may be implemented as, for example, a processor or an ASIC. Means for resetting the accumulated drift count value (e.g., a circuit for resetting accumulated drift count value 1330) may correspond to, for example, a drift compensator as discussed herein and may be implemented as, for example, a processor or an ASIC. Means for using the maintained record (e.g., a circuit for using maintained record 1332) may correspond to, for example, a leading edge identifier as discussed herein and may be implemented as, for example, a processor or an ASIC.

In some cases, these components may be implemented via appropriate processor components. These processor components may in some aspects be implemented, at least in part, using structure as taught herein. In some aspects a processor may be adapted to implement a portion or all of the functionality of one or more of these components. In some aspects, one or more of any components represented by dashed boxes are optional.

As noted above, the apparatus 1300 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIGS. 13-14 as well as other components and functions described herein, may be implemented using any suitable means. Such means also may be implemented, at least in part, using corresponding structure as taught herein. For example, the components described above in conjunction with the "circuit for" components of FIGS. 13-14 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of leading edge detection, comprising:
receiving a signal, wherein the signal comprises a multipath spread pulse including a plurality of lobes;
sampling the received signal to generate samples;
generating a drift compensated signal based on the samples;
reconstructing the received signal based on the drift compensated signal; and
identifying a leading edge associated with the received signal based on the reconstructed signal, wherein identifying the leading edge comprises identifying an earliest received one of the plurality of lobes.

2. The method of claim 1, further comprising:
increasing resolution of the samples to generate higher resolution samples,
wherein the generation of the drift compensated signal comprises time shifting the higher resolution samples.

3. The method of claim 2, wherein the time shifting of the higher resolution samples is performed at a timing resolution that is higher than a timing resolution of the sampling.

4. The method of claim 2, wherein the increasing of the resolution comprises zero insertion.

5. The method of claim 1, wherein the identification of the leading edge employs an interpolation window having a length that is based on a maximum pulse width associated with the received signal.

6. A method of leading edge detection, comprising:
receiving a signal, wherein the received signal comprises a plurality of pulses;
sampling the received signal to generate samples, wherein the samples comprise a plurality of sample sets associated with the pulses;
generating a drift compensated signal based on the samples, wherein the generation of the drift compensated signal comprises time shifting at least one of the sample sets;
reconstructing the received signal based on the drift compensated signal, wherein the reconstructing of the received signal comprises summing the sample sets after the time shifting; and
identifying a leading edge associated with the received signal based on the reconstructed signal.

7. The method of claim 6, wherein the reconstructing of the received signal further comprises performing a thresholding operation to eliminate any isolated elements from the summation of the sample sets.

8. The method of claim 1, wherein the reception of the signal comprises:
determining a noise level of a communication channel used for receiving the signal; and
setting a gain used for receiving the signal based on the noise level.

9. The method of claim 1, wherein the sampling comprise one-bit quantization.

10. The method of claim 1, wherein:
the identification of the leading edge comprises estimating a time of arrival of the leading edge; and
the method further comprises determining a distance between an apparatus that receives the signal and another apparatus based on the estimated time of arrival.

11. A method of leading edge detection, comprising:
receiving a signal, wherein the received signal comprises a set of pulses;
sampling the received signal to generate samples;
generating a drift compensated signal based on the samples;
reconstructing the received signal based on the drift compensated signal;
identifying a leading edge associated with the received signal based on the reconstructed signal;
generating a drift compensated clock signal, wherein the generation of the samples is based on the drift compensated clock signal;
estimating a residual drift associated with the set of pulses;
determining timing of the leading edge; and
adjusting the timing based on the residual drift.

12. The method of claim 11, wherein:
the generation of the drift compensated clock signal comprises adjusting the drift compensated clock signal for clock drift according to a first timing resolution;
the adjustment of the timing is made according to a second timing resolution that is higher than the first timing resolution; and
the adjustment of the timing according to the second timing resolution compensates for residual drift error associated with at least one clock drift adjustment made according to the first timing resolution.

13. The method of claim 11, wherein the estimating of the residual drift comprises:
determining a set of drift estimates corresponding to the set of pulses; and
determining an average of the drift estimates,
wherein the estimated residual drift comprises the determined average of the drift estimates.

14. The method of claim 13, wherein the average of the drift estimates comprises a mean of the drift estimates.

15. The method of claim 11, wherein:
the generation of the drift compensated clock signal is based on a drift estimate provided by a drift compensation algorithm; and
the estimating of the residual drift is based on the drift estimate.

16. The method of claim 15, further comprising generating an accumulated drift count value based on an estimate of accumulated drift over time, wherein the estimating of the residual drift is further based on the accumulated drift count value.

17. The method of claim 16, further comprising:
maintaining a record of the accumulated drift count value if pulse acquisition for ranging is commenced;
resetting the accumulated drift count value if the pulse acquisition for ranging is commenced, wherein the estimating of the residual drift uses the accumulated drift count value after the resetting; and
using the maintained record upon completion of the pulse acquisition for ranging to identify a leading edge associated with the acquired ranging pulses.

18. An apparatus for leading edge detection, comprising:
a receiver configured to receive a signal, and further configured to sample the received signal to generate samples, wherein the signal comprises a multipath spread pulse including a plurality of lobes;
a drift compensator configured to generate a drift compensated signal based on the samples;
a signal reconstructor configured to reconstruct the received signal based on the drift compensated signal; and a leading edge identifier configured to identify a leading edge associated with the received signal based on the reconstructed signal, wherein the leading edge identifier is configured to identify the leading edge by identifying an earliest received one of the plurality of lobes.

19. The apparatus of claim 18, further comprising:
a resolution increaser configured to increase resolution of the samples to generate higher resolution samples,
wherein the generation of the drift compensated signal comprises time shifting the higher resolution samples.

20. The apparatus of claim 19, wherein the time shifting of the higher resolution samples is performed at a timing resolution that is higher than a timing resolution of the sampling.

21. The apparatus of claim 19, wherein the increasing of the resolution comprises zero insertion.

22. The apparatus of claim 18, wherein the identification of the leading edge employs an interpolation window having a length that is based on a maximum pulse width associated with the received signal.

23. An apparatus for leading edge detection, comprising:
a receiver configured to receive a signal, and further configured to sample the received signal to generate samples, wherein the received signal comprises a plurality of pulses, and wherein the samples comprise a plurality of sample sets associated with the pulses;
a drift compensator configured to generate a drift compensated signal based on the samples, wherein the generation of the drift compensated signal comprises time shifting at least one of the sample sets; and
a signal reconstructor configured to reconstruct the received signal based on the drift compensated signal, wherein the reconstructing of the received signal comprises summing the sample sets after the time shifting; and
a leading edge identifier configured to identify a leading edge associated with the received signal based on the reconstructed signal.

24. The apparatus of claim 23, wherein the reconstructing of the received signal further comprises performing a thresholding operation to eliminate any isolated elements from the summation of the sample sets.

25. The apparatus of claim 18, wherein the reception of the signal comprises:
determining a noise level of a communication channel used for receiving the signal; and
setting a gain used for receiving the signal based on the noise level.

26. The apparatus of claim 18, wherein the sampling comprise one-bit quantization.

27. The apparatus of claim 19, wherein:
the identification of the leading edge comprises estimating a time of arrival of the leading edge; and
the apparatus further comprises a distance determiner configured to determine a distance between the apparatus and another apparatus based on the estimated time of arrival.

28. An apparatus for leading edge detection, comprising:
a receiver configured to receive a signal, and further configured to sample the received signal to generate samples, wherein the received signal comprises a set of pulses;
a drift compensator configured to generate a drift compensated signal based on the samples;
a signal reconstructor configured to reconstruct the received signal based on the drift compensated signal;
a leading edge identifier configured to identify a leading edge associated with the received signal based on the reconstructed signal;
a clock generator configured to generate a drift compensated clock signal, wherein the generation of the samples is based on the drift compensated clock signal;
a residual drift estimator configured to estimate a residual drift associated with the set of pulses;
wherein the leading edge identifier is further configured to determine timing of the leading edge; and
wherein the leading edge identifier is further configured to adjust the timing based on the residual drift.

29. The apparatus of claim 28, wherein:
the generation of the drift compensated clock signal comprises adjusting the drift compensated clock signal for clock drift according to a first timing resolution;
the adjustment of the timing is made according to a second timing resolution that is higher than the first timing resolution; and
the adjustment of the timing according to the second timing resolution compensates for residual drift error associated with at least one clock drift adjustment made according to the first timing resolution.

30. The apparatus of claim 28, wherein the estimating of the residual drift comprises:
determining a set of drift estimates corresponding to the set of pulses; and
determining an average of the drift estimates,
wherein the estimated residual drift comprises the determined average of the drift estimates.

31. The apparatus of claim 30, wherein the average of the drift estimates comprises a mean of the drift estimates.

32. The apparatus of claim 28, wherein:
the generation of the drift compensated clock signal is based on a drift estimate provided by a drift compensation algorithm; and
the estimating of the residual drift is based on the drift estimate.

33. The apparatus of claim 32, wherein:
the drift compensator is further configured to generate an accumulated drift count value based on an estimate of accumulated drift over time; and
the estimating of the residual drift is further based on the accumulated drift count value.

34. The apparatus of claim 33, wherein:
the drift compensator is further configured to maintain a record of the accumulated drift count value if pulse acquisition for ranging is commenced;
the drift compensator is further configured to reset the accumulated drift count value if the pulse acquisition for ranging is commenced;
the estimating of the residual drift uses the accumulated drift count value after the resetting; and
the leading edge identifier is further configured to use the maintained record upon completion of the pulse acquisition for ranging to identify a leading edge associated with the acquired ranging pulses.

35. An apparatus for leading edge detection, comprising:
means for receiving a signal, wherein the signal comprises a multipath spread pulse including a plurality of lobes;
means for sampling the received signal to generate samples;
means for generating a drift compensated signal based on the samples;
means for reconstructing the received signal based on the drift compensated signal; and means for identifying a leading edge associated with the received signal based on the reconstructed signal, wherein the leading edge identifying means comprises means for identifying an earliest received one of the plurality of lobes.

36. The apparatus of claim 35, further comprising:
means for increasing resolution of the samples to generate higher resolution samples,
wherein the generation of the drift compensated signal comprises time shifting the higher resolution samples.

37. The apparatus of claim 36, wherein the time shifting of the higher resolution samples is performed at a timing resolution that is higher than a timing resolution of the sampling.

38. The apparatus of claim 36, wherein the increasing of the resolution comprises zero insertion.

39. The apparatus of claim 35, wherein the identification of the leading edge employs an interpolation window having a length that is based on a maximum pulse width associated with the received signal.

40. An apparatus for leading edge detection, comprising:
means for receiving a signal, wherein the received signal comprises a plurality of pulses;
means for sampling the received signal to generate samples, wherein the samples comprise a plurality of sample sets associated with the pulses;
means for generating a drift compensated signal based on the samples, wherein the generation of the drift compensated signal comprises time shifting at least one of the sample sets;
means for reconstructing the received signal based on the drift compensated signal, wherein the reconstructing of the received signal comprises summing the sample sets after the time shifting; and
means for identifying a leading edge associated with the received signal based on the reconstructed signal.

41. The apparatus of claim 40, wherein the reconstructing of the received signal further comprises performing a thresholding operation to eliminate any isolated elements from the summation of the sample sets.

42. The apparatus of claim 35, wherein the reception of the signal comprises:
determining a noise level of a communication channel used for receiving the signal; and
setting a gain used for receiving the signal based on the noise level.

43. The apparatus of claim 35, wherein the sampling comprise one-bit quantization.

44. The apparatus of claim 35, wherein:
the identification of the leading edge comprises estimating a time of arrival of the leading edge; and
the apparatus further comprises means for determining a distance between the apparatus and another apparatus based on the estimated time of arrival.

45. An apparatus for leading edge detection, comprising:
means for receiving a signal, wherein the received signal comprises a set of pulses;
means for sampling the received signal to generate samples;
means for generating a drift compensated signal based on the samples;
means for reconstructing the received signal based on the drift compensated signal;
means for identifying a leading edge associated with the received signal based on the reconstructed signal;
means for generating a drift compensated clock signal, wherein the generation of the samples is based on the drift compensated clock signal;
means for estimating a residual drift associated with the set of pulses;
means for determining timing of the leading edge; and
means for adjusting the timing based on the residual drift.

46. The apparatus of claim 45, wherein:
the generation of the drift compensated clock signal comprises adjusting the drift compensated clock signal for clock drift according to a first timing resolution;
the adjustment of the timing is made according to a second timing resolution that is higher than the first timing resolution; and
the adjustment of the timing according to the second timing resolution compensates for residual drift error associated with at least one clock drift adjustment made according to the first timing resolution.

47. The apparatus of claim 45, wherein the estimating of the residual drift comprises:
determining a set of drift estimates corresponding to the set of pulses; and
determining an average of the drift estimates,
wherein the estimated residual drift comprises the determined average of the drift estimates.

48. The apparatus of claim 47, wherein the average of the drift estimates comprises a mean of the drift estimates.

49. The apparatus of claim 45, wherein:
the generation of the drift compensated clock signal is based on a drift estimate provided by a drift compensation algorithm; and
the estimating of the residual drift is based on the drift estimate.

50. The apparatus of claim 49, further comprising means for generating an accumulated drift count value based on an estimate of accumulated drift over time, wherein the estimating of the residual drift is further based on the accumulated drift count value.

51. The apparatus of claim 50, further comprising:
means for maintaining a record of the accumulated drift count value if pulse acquisition for ranging is commenced;
means for resetting the accumulated drift count value if the pulse acquisition for ranging is commenced, wherein the estimating of the residual drift uses the accumulated drift count value after the resetting; and
means for using the maintained record upon completion of the pulse acquisition for ranging to identify a leading edge associated with the acquired ranging pulses.

52. A computer-program product for leading edge detection, comprising:
a non-transitory computer-readable medium embedded with the computer-program product that includes codes executable by an apparatus for:
receiving a signal, wherein the received signal comprises a plurality of pulses;
sampling the received signal to generate samples, wherein the samples comprise a plurality of sample sets associated with the pulses;
generating a drift compensated signal based on the samples, wherein the generation of the drift compensated signal comprises time shifting at least one of the sample sets;
reconstructing the received signal based on the drift compensated signal, wherein the reconstructing of the received signal comprises summing the sample sets after the time shifting; and
identifying a leading edge associated with the received signal based on the reconstructed signal.

53. A headset, comprising:

a receiver configured to receive a signal, and further configured to sample the received signal to generate samples, wherein the received signal comprises a plurality of pulses, and wherein the samples comprise a plurality of sample sets associated with the pulses;

a drift compensator configured to generate a drift compensated signal based on the samples, wherein the generation of the drift compensated signal comprises time shifting at least one of the sample sets;

a signal reconstructor configured to reconstruct the received signal based on the drift compensated signal, wherein the reconstructing of the received signal comprises summing the sample sets after the time shifting;

a leading edge identifier configured to identify a leading edge associated with the received signal based on the reconstructed signal; and a transducer configured to provide an audio output as a result of the identification of the leading edge.

54. A watch, comprising:

a receiver configured to receive a signal, and further configured to sample the received signal to generate samples, wherein the received signal comprises a plurality of pulses, and wherein the samples comprise a plurality of sample sets associated with the pulses;

a drift compensator configured to generate a drift compensated signal based on the samples, wherein the generation of the drift compensated signal comprises time shifting at least one of the sample sets;

a signal reconstructor configured to reconstruct the received signal based on the drift compensated signal, wherein the reconstructing of the received signal comprises summing the sample sets after the time shifting;

a leading edge identifier configured to identify a leading edge associated with the received signal based on the reconstructed signal; and a user interface configured to provide an indication as a result of the identification of the leading edge.

55. A sensing device, comprising:

a receiver configured to receive a signal, and further configured to sample the received signal to generate samples, wherein the received signal comprises a plurality of pulses, and wherein the samples comprise a plurality of sample sets associated with the pulses;

a drift compensator configured to generate a drift compensated signal based on the samples, wherein the generation of the drift compensated signal comprises time shifting at least one of the sample sets;

a signal reconstructor configured to reconstruct the received signal based on the drift compensated signal, wherein the reconstructing of the received signal comprises summing the sample sets after the time shifting;

a leading edge identifier configured to identify a leading edge associated with the received signal based on the reconstructed signal; and a sensor configured to provide data for transmission as a result of the identification of the leading edge.

* * * * *